US012695035B2

(12) United States Patent
Fukushima et al.

(10) Patent No.: US 12,695,035 B2
(45) Date of Patent: Jul. 28, 2026

(54) CAPACITOR HAVING A CATHODE FOIL INCLUDING A CARBON LAYER AND METHOD FOR MANUFACTURING SAME

(71) Applicant: NIPPON CHEMI-CON CORPORATION, Tokyo (JP)

(72) Inventors: Kouta Fukushima, Tokyo (JP); Yuki Osuga, Tokyo (JP); Keisuke Tanabe, Tokyo (JP); Shoma Itagaki, Tokyo (JP); Hideyuki Omichi, Tokyo (JP); Masayuki Tarumi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 141 days.

(21) Appl. No.: 18/726,123

(22) PCT Filed: Dec. 19, 2022

(86) PCT No.: PCT/JP2022/046597
§ 371 (c)(1),
(2) Date: Jul. 2, 2024

(87) PCT Pub. No.: WO2023/132212
PCT Pub. Date: Jul. 13, 2023

(65) Prior Publication Data
US 2025/0079089 A1      Mar. 6, 2025

(30) Foreign Application Priority Data

Jan. 6, 2022    (JP) ................................. 2022-000950
Mar. 29, 2022   (JP) ................................. 2022-054271

(51) Int. Cl.
*H01G 9/042*        (2006.01)
*H01G 9/008*        (2006.01)
(Continued)

(52) U.S. Cl.
CPC ........... *H01G 9/0425* (2013.01); *H01G 9/008* (2013.01); *H01G 13/006* (2013.01); *H01G 9/055* (2013.01); *H01G 9/151* (2013.01)

(58) Field of Classification Search
None
See application file for complete search history.

(56) References Cited

U.S. PATENT DOCUMENTS

2019/0371531 A1* 12/2019 Fukushima ............ H01G 9/055

FOREIGN PATENT DOCUMENTS

| JP | 08236401 A | * | 9/1996 |
| JP | 2006-080111 A | | 3/2006 |

(Continued)

OTHER PUBLICATIONS

Mar. 14, 2023, International Search Report issued for related PCT Application No. PCT/JP2022/046597.

(Continued)

*Primary Examiner* — Eric W Thomas
(74) *Attorney, Agent, or Firm* — Paratus Law Group, PLLC

(57) ABSTRACT

A capacitor includes: a cathode foil including a carbon layer disposed at a surface of a base material foil; and a lead-out terminal including a flat portion connected to the cathode foil by stitch connection at a stitch connection portion, and a thickness of the stitch connection portion is equal to or less than a total thickness of a thickness of the cathode foil and a thickness of the flat portion.

20 Claims, 14 Drawing Sheets

(51) Int. Cl.
    *H01G 13/00*         (2013.01)
    *H01G 9/055*      (2006.01)
    *H01G 9/15*       (2006.01)

(56)          References Cited

FOREIGN PATENT DOCUMENTS

| | | | | | |
|---|---|---|---|---|---|
| JP | 2009130338 | A | * | 6/2009 | |
| JP | 2009212283 | A | * | 9/2009 | |
| JP | 2011077260 | A | * | 4/2011 | |
| JP | 2014197614 | A | * | 10/2014 | |
| JP | 2018120939 | A | * | 8/2018 | ............ H01G 9/055 |
| JP | 2021097164 | A | * | 6/2021 | |
| WO | WO-2007058204 | A1 | * | 5/2007 | .............. H01G 9/04 |

OTHER PUBLICATIONS

Mar. 14, 2023, International Search Opinion issued for related PCT Application No. PCT/JP2022/046597.

* cited by examiner

[RESULT OF FIRST EXPERIMENT]

| POSITION OF TERMINAL END 66 | PROTRUDE | | COINCIDE | RETRACT | | | | | | |
|---|---|---|---|---|---|---|---|---|---|---|
| DISTANCE Y1 [mm] | | | 0.0 | 0.1 | 0.2 | 0.3 | 0.4 | 0.5 | 0.6 | 0.7 |
| DISTANCE Y2 [mm] | 0.15 | 0.1 | 0.05 | | | | | | | |
| FOIL CRACK | NO | NO | NO | NO | NO | YES | YES | YES | NO | NO | NO |

FIG. 11

[ RESULT OF SECOND EXPERIMENT ]

| POSITION OF PRESS MARK END 68 | RETRACT | | | COINCIDE | PROTRUDE | | |
|---|---|---|---|---|---|---|---|
| | 0.3 | 0.2 | 0.1 | 0.0 | 0.1 | 0.2 | 0.3 |
| DISTANCE Z1 [mm] | 0.3 | 0.2 | 0.1 | 0.0 | | | |
| DISTANCE Z2 [mm] | | | | 0.0 | 0.1 | 0.2 | 0.3 |
| FOIL CRACK | YES | YES | NO | NO | NO | NO | NO |

CAPACITOR HAVING A CATHODE FOIL INCLUDING A CARBON LAYER AND METHOD FOR MANUFACTURING SAME

CROSS REFERENCE TO PRIOR APPLICATION

This application is a National Stage Patent Application of PCT International Patent Application No. PCT/JP2022/046597 (filed on Dec. 19, 2022) under 35 U.S.C. § 371, which claims priority to Japanese Patent Application Nos. 2022-000950 (filed on Jan. 6, 2022) and 2022-054271 (filed on Mar. 29, 2022), which are all hereby incorporated by reference in their entirety.

TECHNICAL FIELD

The present disclosure relates to a capacitor including a cathode foil including a carbon layer, and a method for manufacturing the same.

BACKGROUND ART

A capacitor includes an anode foil, a cathode foil, and a separator disposed between the anode foil and the cathode foil, and can store electricity. In relation to such a capacitor, a basic capacitor including a basic cathode foil formed only of an aluminum foil is known. In recent years, a capacitor including a cathode foil including a carbon layer has been known (for example, Patent Literature 1). The carbon layer has an effect of increasing electrostatic capacitance of the cathode foil, for example.

PRIOR ART DOCUMENT

Patent Literature

Patent Literature 1: JP2006-80111A

SUMMARY OF INVENTION

Problem to be Solved by the Invention

An electrode foil is connected to a lead-out terminal by connection methods such as stitch connection. In a stitch connecting process for forming the stitch connection, a stitch needle is inserted into the lead-out terminal and the electrode foil overlapped each other from the lead-out terminal side, a terminal hole and a terminal piece are formed in the lead-out terminal, and a through hole and a foil piece are formed in the electrode foil. The terminal piece protrudes from a back surface of the electrode foil through the through hole of the electrode foil. The terminal piece and the foil piece are pressed and overlapped on the back surface of the electrode foil. As a result, the stitch connection is formed, and the electrode foil is connected to the lead-out terminal.

Here, the carbon layer is formed by, for example, applying a slurry mainly composed of carbon particles and a binder to a surface of an aluminum foil and bonding the carbon particles to each other by the binder. In the cathode foil including the carbon layer, the binder contained in the carbon layer causes a stress toward the outside around a pressing portion against a pressing force against the carbon layer, and the cathode foil including the carbon layer is easier to stretch than a basic cathode foil formed of only a metal foil such as an aluminum foil. In the stitch connecting process of the cathode foil having the carbon layer, the carbon layer stretches when the terminal piece and the foil piece are pressed, and a base material of the cathode foil stretches following the carbon layer. That is, there is a problem that the cathode foil having the carbon layer is easier to stretch than the basic cathode foil in the stitch connecting process. Since the pressing force is weakened when the cathode foil stretches, there is a problem that it is more difficult to connect the lead-out terminal to the cathode foil by the stitch connecting process.

Patent Literature 1 does not disclose or suggest such a problem, and the configuration disclosed in Patent Literature 1 cannot solve such a problem.

An object of the present disclosure is to provide a stitch connection structure suitable for a cathode foil including a carbon layer, for example.

Means for Solving the Problem

According to a first aspect of the present disclosure, a capacitor includes a cathode foil including a carbon layer disposed at a surface of a base material foil, and a lead-out terminal including a flat portion connected to the cathode foil by stitch connection at a stitch connection portion. A thickness of the stitch connection portion is equal to or less than a total thickness of a thickness of the cathode foil and a thickness of the flat portion.

In the above capacitor, a terminal end of the lead-out terminal may protrude from a foil end of the cathode foil, may coincide with the foil end, or may overlap the cathode foil at an interval of 0.1 millimeter or less or 0.5 millimeter or more from the foil end.

In the above capacitor, the thickness of the stitch connection portion may be less than the total thickness.

In the above capacitor, an absolute value of a difference between the thickness of the stitch connection portion and the total thickness may be 0.02 millimeter or less.

In the above capacitor, the thickness of the flat portion may be 0.18 millimeter or more and 0.35 millimeter or less. The thickness of the cathode foil may be 0.01 millimeter or more and 0.06 millimeter or less.

According to a second aspect of the present disclosure, a method for manufacturing a capacitor includes a step of producing a cathode foil including a carbon layer disposed at a surface of a base material foil, and a step of disposing a flat portion of a lead-out terminal on a terminal arrangement surface of the cathode foil, and connecting the flat portion to the cathode foil at a stitch connection portion by a stitch connecting process so that a thickness of the stitch connection portion is equal to or less than a total thickness of a thickness of the cathode foil and a thickness of the flat portion.

In the step of connecting the flat portion to the cathode foil, the flat portion may be connected to the cathode foil so that a terminal end of the lead-out terminal protrudes from a foil end of the cathode foil, or in the step of connecting the flat portion to the cathode foil, the flat portion may be connected to the cathode foil so that the terminal end coincides with the foil end or overlaps the cathode foil at an interval of 0.1 millimeter or less or 0.5 millimeter or more from the foil end.

According to a third aspect of the present disclosure, a method for manufacturing a capacitor includes: a step of grasping a thickness of a cathode foil including a carbon layer disposed at a surface of a base material foil and a thickness of a flat portion of a lead-out terminal; a step of determining a thickness of a stitch connection portion so that the thickness of the stitch connection portion is equal to or less than a total thickness of the thickness of the cathode foil and the thickness of the flat portion; a step of adjusting a stitch connection device so that the stitch connection device crushes the stitch connection portion until the thickness of the stitch connection portion becomes the determined thickness; and a step of connecting the flat portion to the cathode foil by the adjusted stitch connection device.

In the step of adjusting the stitch connection device, the stitch connection device may be adjusted so that a terminal end of the lead-out terminal protrudes from a foil end of the cathode foil, or in the step of adjusting the stitch connection device, the stitch connection device may be adjusted so that the terminal end coincides with the foil end or overlaps the cathode foil at an interval of 0.1 millimeter or less or 0.5 millimeter or more from the foil end.

Effects of Invention

According to the above aspects of the present disclosure, for example, any of the following effects can be obtained.

(1) Since the thickness of the stitch connection portion is equal to or less than the total thickness of the thickness of the cathode foil and the thickness of the flat portion of the lead-out terminal, equivalent series resistance can be reduced and stabilized.

(2) The stitch connection suitable for a property of the cathode foil can be realized.

(3) The stability and reliability of the capacitor including the cathode foil including the carbon layer can be improved.

BRIEF DESCRIPTION OF DRAWINGS

FIG. 8 is a diagram illustrating a result of a first experiment.

FIG. 11 is a diagram illustrating a result of a second experiment.

EMBODIMENTS FOR CARRYING OUT THE INVENTION

Hereinafter, embodiments will be described with reference to the drawings.

First Embodiment

Figure 1:
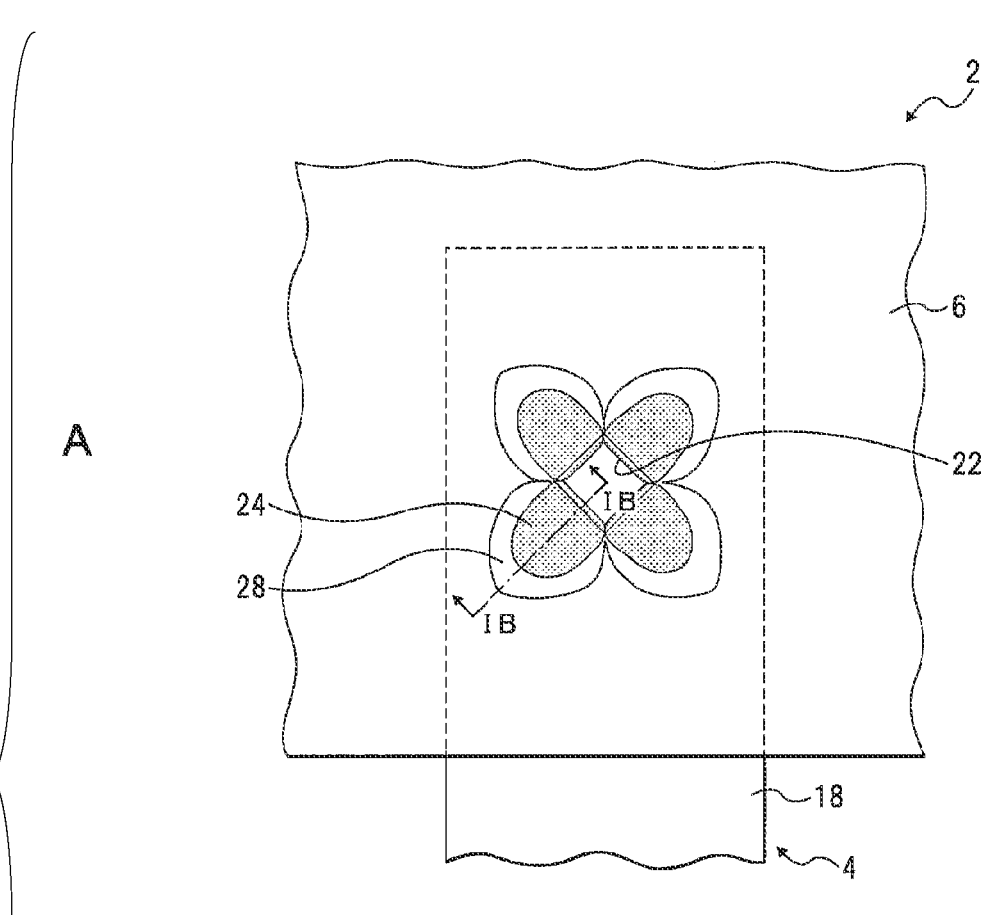
FIG. 1 is a diagram illustrating an example of a terminal connection portion of a capacitor according to a first embodiment.
Figure 1:
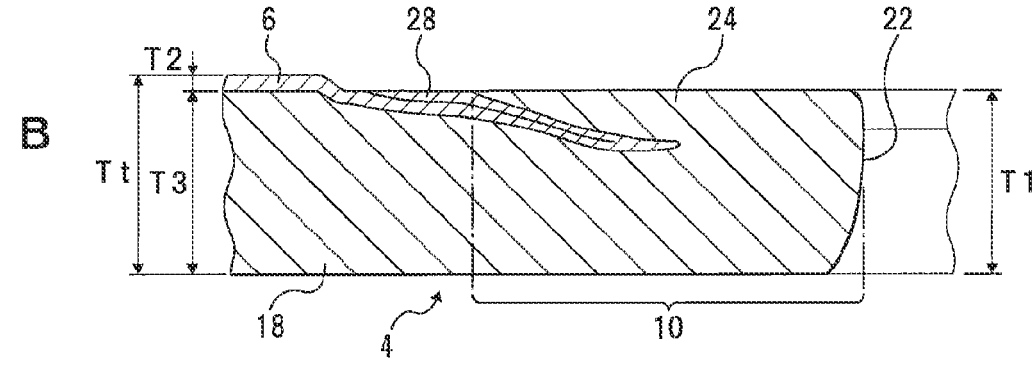
Figure 2:
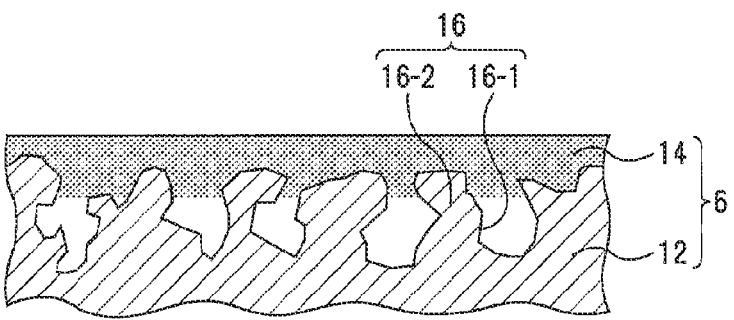
FIG. 2 is a diagram illustrating an example of an end surface of a cathode foil.

FIG. 1 illustrates an example of a cathode foil and a terminal connection portion of a lead-out terminal of a capacitor according to a first embodiment. FIG. 2 illustrates an example of an end surface of the cathode foil. The configuration illustrated in FIGS. 1 and 2 is an example, and the technology of the present disclosure is not limited to such a configuration. In the first embodiment, the terminal connection portion includes a connection place where the lead-out terminal 4 is connected to the cathode foil 6 by stitch connection, that is, a stitch connection portion 10 and a peripheral portion thereof. A shaded portion in A of FIG. 1 represents the stitch connection portion 10. B of FIG. 1 is a cross-sectional view taken along a line IB-IB in A of FIG. 1. That is, the stitch connection portion 10 is an area where a terminal piece 24 is disposed, and refers to an area including a portion where the lead-out terminal 4, the cathode foil 6, a foil piece 28, and the terminal piece 24 are stacked from the terminal hole 22.

The capacitor 2 is an example of an electronic component, and is, for example, an electrolytic capacitor. The capacitor 2 includes, for example, a capacitor element (not illustrated), the lead-out terminal 4, and an electrolyte, a sealing member, and an exterior case, which are not illustrated.

The capacitor element includes the cathode foil 6, an anode foil, and a separator. The cathode foil 6, the anode foil, and the separator are overlapped and wound so that the separator is disposed between the cathode foil 6 and the anode foil, thereby forming a winding element. The winding element forms the capacitor element.

The cathode foil 6 constitutes an electrode on a cathode side of the capacitor 2. The cathode foil 6 is, for example, a strip-shaped foil, and includes abase material foil 12 and a carbon layer 14. Examples of the base material foil 12 include valve metal foils such as an aluminum foil, a tantalum foil, a niobium foil, a titanium foil, a hafnium foil, a zirconium foil, a zinc foil, a tungsten foil, a bismuth foil, and an antimony foil. As illustrated in FIG. 2, a surface of the base material foil 12 has unevenness 16 formed by etching, for example, that is, recesses 16-1 and protrusions 16-2, and a surface area of the base material foil 12 is enlarged. The surface of the base material foil 12 may include, for example, a tunnel-like or sponge-like etching pit, and the tunnel-like or sponge-like etching pit may form the recess 16-1 and the protrusion 16-2.

The carbon layers 14 are disposed on both surfaces of the base material foil 12, for example. The carbon layer 14 may be disposed only on one surface of the base material foil 12. As illustrated in FIG. 2, the carbon layer 14 partially enters the inside of the recesses 16-1 of the unevenness 16, and thus closely adheres to and engaged with the unevenness 16 of the base material foil 12. That is, the carbon layer 14 has a surface shape that engages with the unevenness 16. The carbon layer 14 is disposed outside the base material foil 12, and the cathode foil 6 has a two-layer structure including the base material foil 12 and the carbon layer 14 or a three-layer structure in which the carbon layers 14 are disposed on both surfaces of the base material foil 12. The carbon layer 14 contains a carbon material as a main material, and further contains a binder and a dispersant as additives.

Examples of a carbon material include activated carbon, carbon black, carbon nanohorn, amorphous carbon, natural graphite, artificial graphite, graphitized Ketjen black, mesoporous carbon, and fibrous carbon. The activated carbon is produced from, for example, natural plant tissues such as coconut shells, synthetic resins such as phenol, and those derived from fossil fuels such as coal, coke, or pitch. Examples of the carbon black include Ketjen black, acetylene black, channel black, thermal black, or the like. The fibrous carbon is a carbon nanotube, a carbon nanofiber, or the like. The carbon nanotube may be a single-walled carbon nanotube with a single layer of graphene sheets, or a multi-walled carbon nanotube (MWCNT) with two or more layers of graphene sheets rolled coaxially to form a multi-layered tube wall.

The carbon material is preferably carbon black which is spherical carbon. By using spherical carbon black having an average primary particle diameter of 100 nanometers or less, the carbon layer 14 becomes dense, and the carbon layer 14 easily closely adheres to an expanded surface layer, so that interface resistance between the carbon layer 14 and the base material foil 12 easily decreases. The carbon material is also preferably a mixture containing spherical carbon and graphite. The graphite is, for example, natural graphite, artificial graphite, graphitized Ketjen black, or the like, and has a shape such as a scaly shape, a scale shape, a lump shape, a soil shape, a spherical shape, or a flake shape. The graphite is preferably scaly or flaky, and an aspect ratio of a short diameter to a long diameter of the graphite is preferably in a range of 1:5 to 1:100. The scaly or flaky graphite having the aspect ratio described above pushes spherical carbon into the recess 16-1 of the unevenness 16 such as an etching pit, and a part of the carbon layer 14 can be formed up to the etching pit. Therefore, the carbon layer 14 can firmly adhere to the base material foil 12 by an anchor effect.

When an average particle diameter of the graphite is 6 micrometers (hereinafter, referred to as "μm") or more and 10 μm or less, an effect of preventing a decrease in electrostatic capacitance due to a high temperature environmental load can be obtained. In addition, when the average particle diameter of the graphite is 6 μm or less, it is possible to increase the electrostatic capacitance of the capacitor 2 while preventing a decrease in the electrostatic capacitance due to a high temperature environmental load. When the average particle diameter of the graphite is 6 μm or less, the graphite is easily retained in the carbon layer 14, and an addition amount of the binder can be reduced. By reducing the addition amount of the binder, a ratio of the carbon material increases. Therefore, electric resistance of the cathode foil 6 can be reduced, and the equivalent series resistance of the capacitor 2 can be reduced. The numerical value of the above average particle diameter is a numerical value based on the median diameter, so-called D50.

In the case where the carbon material is a mixture of graphite and spherical carbon, a mass ratio of graphite to the mixture of graphite and spherical carbon [mass of graphite/(mass of graphite+mass of spherical carbon)] is, for example, in a range of 25% or more and 90% or less, in order to obtain the effect of the combined use of graphite and spherical carbon.

The binder is, for example, a resin-based binder such as styrene butadiene rubber, polyvinylidene fluoride, or polytetrafluoroethylene, and binds a carbon material. The dispersant is, for example, sodium carboxymethyl cellulose. The carbon layer 14 is made of, for example, an aqueous solution in which spherical carbon is dispersed. The dispersant can disperse the carbon material in the aqueous solution.

The anode foil constitutes an electrode on an anode side of the capacitor 2. The anode foil is, for example, a valve metal foil such as a tantalum foil or an aluminum foil, and is, for example, a strip-shaped foil. A surface of the anode foil has unevenness formed by etching, for example, and includes a dielectric oxide film formed by chemical conversion treatment, for example. The unevenness formed by etching has, for example, a porous structure.

The separator is disposed between the anode foil and the cathode foil 6 to prevent a short circuit between the anode foil and the cathode foil 6. The separator is an insulating material and includes a kraft, and may include other separator members such as Manila hemp, esparto, hump, rayon, cellulose, and a mixed material thereof.

The cathode foil 6 is connected to the lead-out terminal 4 by stitch connection. The anode foil is connected to another lead-out terminal (not illustrated) (hereinafter referred to as a "lead-out terminal 4" for convenience) by stitch connection or other connection methods. The lead-out terminal 4 protrudes from one end surface of the capacitor element. The lead-out terminal 4 is made of, for example, a highly conductive metal such as aluminum. The lead-out terminal 4 includes, for example, an aluminum wire and a metal wire 17 (FIG. 7), and the aluminum wire and the metal wire 17 are connected by arc welding or the like. The aluminum wire includes a substantially cylindrical round rod portion and a flat portion 18 formed by press working or the like of the round rod portion, and the round rod portion has an inclined portion whose thickness linearly decreases to a thickness of the flat portion 18 on the flat portion 18 side. The flat portion 18 is overlapped on the cathode foil 6 and is connected to the cathode foil 6 by stitch connection to form the stitch connection portion 10. That is, the flat portion 18 is connected to the cathode foil 6 by stitch connection at the stitch connection portion 10.

The electrolyte contains at least an electrolytic solution and is filled in voids and separators in the capacitor element.

The sealing member is formed of, for example, insulating rubber. The sealing member has an insertion hole at a position corresponding to the lead-out terminal 4. The lead-out terminal 4 penetrates the insertion hole of the sealing member and is exposed to the outside of the capacitor 2.

The exterior case is, for example, a bottomed tubular aluminum case. The capacitor element and a part of the lead-out terminal 4 are inserted into the exterior case together with the electrolyte. The sealing member is installed in an opening portion of the exterior case to seal the inside of the exterior case. That is, the capacitor element and a part of the lead-out terminal 4 are sealed in the exterior case. The lead-out terminal 4 passes through the through hole of the sealing member and protrudes from the sealing member.

As described above, the flat portion 18 is connected to the cathode foil 6 by stitch connection, and the stitch connection portion 10 is formed. The flat portion 18 includes the terminal hole 22 and the terminal piece 24, and the cathode foil 6 includes the through hole and the foil piece 28. The terminal hole 22, the terminal piece 24, the through hole, and the foil piece 28 are formed by inserting a stitch needle 46 (FIG. 6) from the lead-out terminal 4 side. The terminal hole 22 is disposed at a position overlapping the through hole.

The terminal piece 24 and the foil piece 28 are folded back by pressing from the cathode foil 6 side, and are pressed against a back surface of the cathode foil 6, that is, an opposing surface of a terminal arrangement surface.

The stitch connection portion 10 is an area where the flat portion 18 and the cathode foil 6 are connected to each other, and is defined as, for example, an area where the terminal piece 24 is disposed in A of FIG. 1. In the stitch connection portion 10, as illustrated in B of FIG. 1, the flat portion 18 and the terminal piece 24 that form a fold sandwich the cathode foil 6 and the foil piece 28 from two surfaces, for example, upper and lower surfaces.

A thickness T1 of the stitch connection portion 10 is equal to or less than the total thickness Tt of a thickness T2 of the cathode foil 6 and a thickness T3 of the flat portion 18, and is expressed by the following formula (1).

$$T1 \le Tt = T2 + T3 \qquad (1)$$

When the thickness T1 of the stitch connection portion 10 is equal to or less than the total thickness Tt, the equivalent series resistance of the capacitor 2 can be reduced and stabilized, and when the thickness T1 is less than the total thickness Tt, the equivalent series resistance of the capacitor 2 is further reduced and further stabilized. The thickness T2 of the cathode foil 6 and the thickness T3 of the flat portion 18 can be freely set, and may be appropriately set according to the specification of the capacitor 2, for example. From a viewpoint of practical and economical efficiency, the thickness T2 of cathode foil 6 is, for example, 0.01 millimeter (hereinafter, referred to as "mm") or more and 0.06 mm or less, and the thickness T3 of flat portion 18 is, for example, 0.18 mm or more and 0.35 mm or less. When the thickness T3 of the flat portion 18 is 0.18 mm or more, the equivalent series resistance is reduced and does not become a large value, and when the thickness T3 is 0.35 mm or less, a volumetric efficiency of the element does not deteriorate.

Figure 3:
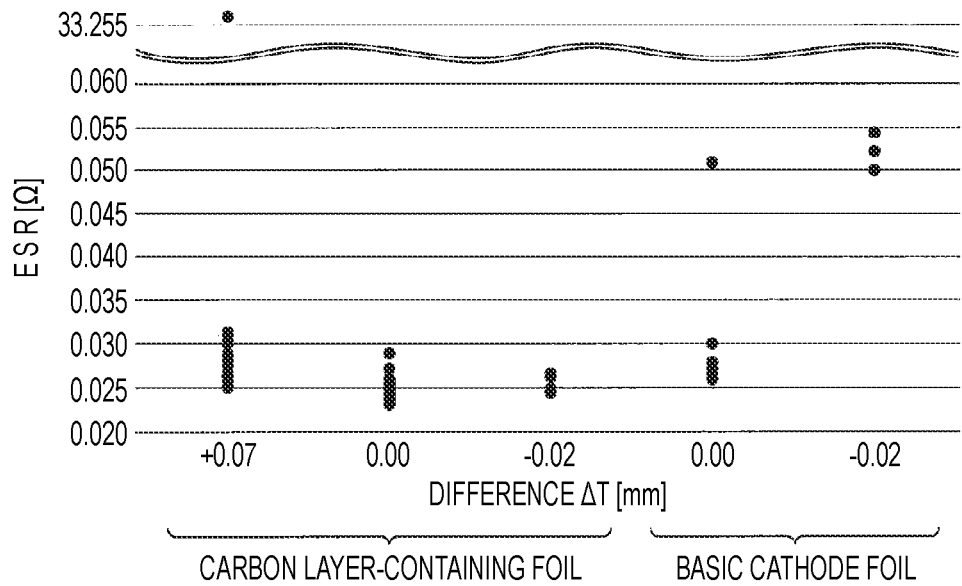
FIG. 3 is a graph illustrating an example of a relationship between a difference ΔT between a thickness of a stitch connection portion and the total thickness of the cathode foil and a flat portion and equivalent series resistance (ESR).
Figure 4:
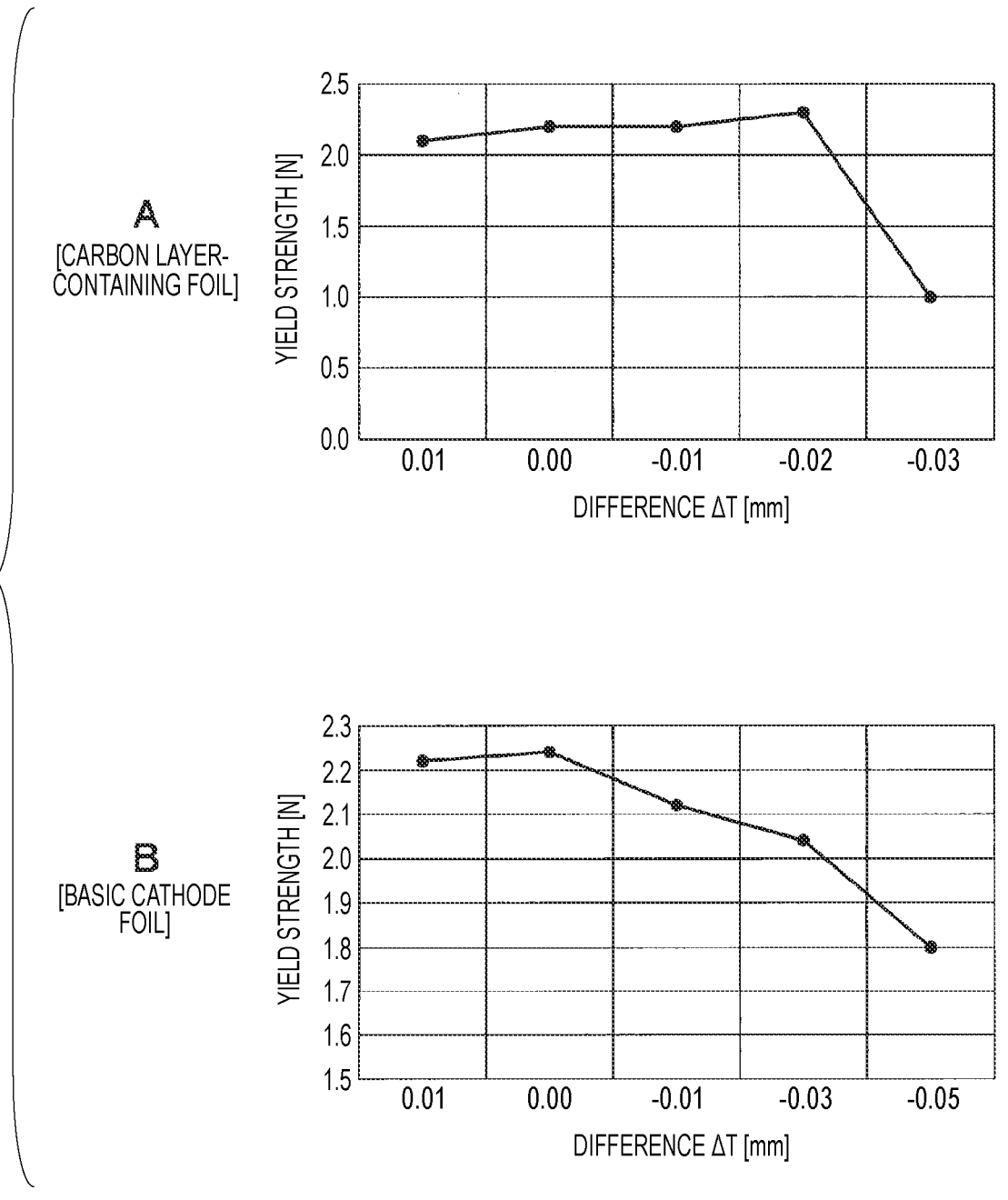
FIG. 4 is a graph illustrating an example of a relationship between the difference ΔT and yield strength of a foil.
Figure 5:
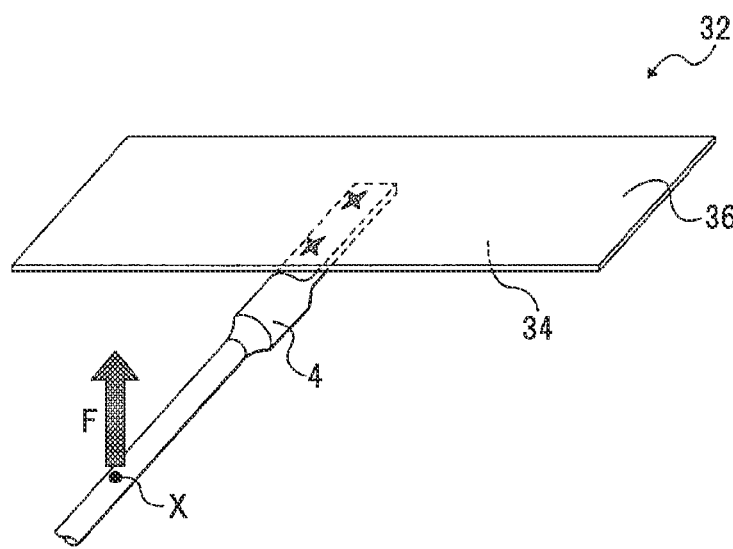
FIG. 5 is a diagram illustrating an example of a method for measuring the yield strength of the foil.

FIG. 3 is a graph illustrating an example of a relationship between a difference ΔT between the thickness T1 and the total thickness Tt and the equivalent series resistance (ESR). FIG. 4 is a graph illustrating an example of a relationship between the difference ΔT and a yield strength of the foil. FIG. 5 is a diagram illustrating an example of a method for measuring the yield strength of the foil. The difference ΔT is expressed by the following formula (2).

$$\Delta T = T1 - Tt \qquad (2)$$

In FIGS. 3 and 4, a carbon layer-containing foil represents the cathode foil 6 including the carbon layer 14. In the test for obtaining the relationship between the difference ΔT and the equivalent series resistance and the test for obtaining the relationship between the difference ΔT and the yield strength of the foil, the cathode foil 6 having the thickness T2 of 0.02 mm and the lead-out terminal 4 including the flat portion 18 having the thickness T3 of 0.23 mm are used. That is, when the total thickness Tt is 0.25 mm and the thickness T1 of the stitch connection portion 10 is 0.25 mm, the difference ΔT is 0.00 mm.

In the graph illustrated in FIG. 3, as the value of the difference ΔT decreases, the equivalent series resistance of the capacitor 2 using the carbon layer-including foil decreases. In the connection between the cathode foil 6 and the lead-out terminal 4, there is no connection having an extremely high equivalent series resistance in the area of the difference ΔT of 0.00 mm or less. According to the graph illustrated in FIG. 3, when the thickness T1 of the stitch connection portion 10 is equal to or less than the total thickness Tt, the equivalent series resistance is reduced and stabilized.

The graph illustrated in FIG. 3 includes equivalent series resistance data of a capacitor using a basic cathode foil for comparison. The basic cathode foil represents a cathode foil not including a carbon layer, and a thickness of the basic cathode foil is 0.02 mm, which is the same as the thickness T2 of the cathode foil 6 in this test. It is understood that the equivalent series resistance of the capacitor 2 using the carbon layer-containing foil is smaller than the equivalent series resistance of the capacitor using the basic cathode foil having the same difference ΔT, and the variation is small. That is, by satisfying a requirement of "T1≤Tt" which is not superior to the capacitor using the basic cathode foil, the capacitor 2 using the carbon layer-containing foil can obtain reduced and stable equivalent series resistance.

In the graph illustrated in A of FIG. 4, the yield strength of the carbon layer-containing foil increases until the difference ΔT decreases to −0.02 mm. In this graph, when the difference ΔT is −0.02 mm or more and 0.00 mm or less, a relatively high yield strength of the foil is obtained. That is, the thickness T1 of the stitch connection portion 10 is preferably equal to or less than the total thickness Tt, and the absolute value (|ΔT|) of the difference ΔT is preferably 0.02 mm, that is, equal to or less than the thickness T2 of the cathode foil 6.

The graph illustrated in B of FIG. 4 illustrates the yield strength of the previously described basic cathode foil for comparison. The yield strength of the basic cathode foil is highest when the difference ΔT is 0.00 mm, and decreases as the difference ΔT becomes smaller than 0.00 mm. That is, by satisfying requirements of "T1≤Tt" and "|ΔT|≤0.02 mm, or |ΔT|≤T2", which are not superior to the capacitor including the basic cathode foil, the capacitor 2 using the carbon layer-containing foil can obtain relatively high yield strength of the foil.

FIG. 5 illustrates the example of the method for measuring the yield strength of the foil. A tensile force F that is perpendicular to a foil 32 and is directed above a second main surface 36 of the foil 32 is applied to a tensile point X of the lead-out terminal 4 attached to a first main surface 34 of the foil 32. The foil 32 is a carbon layer-containing foil, that is, the cathode foil 6 or the basic cathode foil. The yield strength of the foil is defined as, for example, the magnitude of the tensile force F when a crack occurs in the foil 32. The test for the yield strength of the foil is not limited to the test illustrated in FIG. 5 as long as the magnitude of the yield strength of the foil can be relatively evaluated. In addition, the tensile point X may be fixed in a series of tests, and may be freely set.

[Manufacturing Steps of Capacitor]

Manufacturing steps of the capacitor 2 are an example of a method for manufacturing the capacitor according to the present disclosure, and includes, for example, a producing step of the anode foil, a producing step of the cathode foil 6, a producing step of the separator, a grasping step of the thickness T2 of the cathode foil 6 and the thickness T3 of the flat portion 18 of the lead-out terminal 4, a determining step of the thickness T1 of the stitch connection portion 10, an adjusting step of a stitch connection device 40 (FIG. 6), a connecting step of the lead-out terminal 4 to the electrode foil (hereinafter, referred to as a "connecting step of the lead-out terminal"), a producing step of the capacitor element, and a sealing step of the capacitor element.

In the producing step of the anode foil, the surface of a valve metal foil such as a tantalum foil or an aluminum foil is etched to form unevenness at the surface of the valve metal foil. The valve metal foil after the etching treatment is subjected to a chemical conversion treatment to form a dielectric oxide film at the surface of the valve metal foil. The valve metal foil is etched by applying a current to the valve metal foil immersed in a chloride aqueous solution such as hydrochloric acid or sodium chloride. The applied current may be a direct current or an alternating current. In the chemical conversion treatment of the valve metal foil, for example, a voltage is applied to the valve metal foil immersed in an electrolytic solution containing a solution of ammonium borate, ammonium borate, ammonium phosphate, ammonium adipate, or the like. The formed valve metal foil is cut to produce an anode foil.

In the producing step of the cathode foil 6, the base material foil 12 is produced by etching the surface of a valve metal foil such as an aluminum foil, a tantalum foil, a niobium foil, a titanium foil, a hafnium foil, a zirconium foil, a zinc foil, a tungsten foil, a bismuth foil, or an antimony foil to form the unevenness 16 at the surface of the valve metal foil. The etching on the cathode foil 6 side may be the same as or different from the etching on the anode foil side. The carbon layer 14 is formed on the valve metal foil after the etching treatment, that is, the base material foil 12, and the base material foil 12 on which the carbon layer 14 is formed is cut to produce the cathode foil 6.

The carbon layer 14 is produced as follows. The carbon material, the binder, and the dispersant described above are added to a diluent, and the mixture is mixed with by a dispersion treatment such as a mixer, jet mixing (jet collision), ultracentrifugation, or ultrasonic treatment to form a slurry. The binder is added in an amount necessary for bonding the carbon material, for example, and the dispersant is added in an amount necessary for dispersing the carbon material, for example. Therefore, addition amounts of the binder and the dispersant are smaller than the addition amount of the carbon material. When graphite is used as the carbon material, the graphite may be pulverized by a pulverizer such as a bead mill or a ball mill, and the average particle diameter of the graphite may be adjusted before addition to the diluent.

Examples of the diluent include alcohols, hydrocarbon-based solvents, aromatic solvents, amide-based solvents, water, and mixtures thereof. The alcohol is, for example, methanol, ethanol, or 2-propanol. The amide-based solvent is, for example, N-methyl-2-pyrrolidone (NMP) or N, N-dimethylformamide (DMF).

The slurry is applied to the valve metal foil after the etching treatment, that is, the base material foil 12. Since the unevenness 16 is formed on the base material foil 12, the carbon material enters the unevenness 16 to improve adhesion. After the slurry is dried to volatilize the solvent to form the carbon layer 14, the carbon layer 14 is pressed. When a press working step is added in addition to the formation of the unevenness 16, the carbon material can be pushed into fine pores of the unevenness 16, the carbon material can be deformed along an unevenness surface of the unevenness 16, and adhesion and the fixing property between the carbon layer 14 and the base material foil 12 are further improved. When the carbon material contains graphite, the graphite is aligned by pressing, and the graphite is deformed along the unevenness 16 of the base material foil 12. Further, when the graphite is pressed against the unevenness 16, the spherical carbon is pushed into the inside of the recess 16-1 such as the fine pore of the base material foil 12. As a result, the slurry closely adheres to the base material foil 12, and the carbon layer 14 closely adhering to the base material foil 12 is obtained. When the carbon material is only spherical carbon, in particular, spherical carbon having an average primary particle diameter of 100 nanometers or less is used, so that the spherical carbon easily enters the recess 16-1, and thus the interface resistance between the carbon layer 14 and the base material foil 12 easily decreases. In addition, since graphite is not contained, a static friction coefficient of the surface of the carbon layer 14 is improved, and when the terminal piece 24 is pressed against the foil piece 28, the terminal piece 24 does not easily slip, and stitch connection with stable connectivity is obtained.

In the producing step of the separator, the separator member described above is cut to produce the separator.

In the grasping step of the thickness T2 of the cathode foil 6 and the thickness T3 of the flat portion 18 of the lead-out terminal 4, the thickness T2 of the cathode foil 6 and the thickness T3 of the flat portion 18 are grasped. For example, with reference to dimension standard values or dimension public values such as dimension inspection values of the thicknesses T2 and T3, these dimension public values are grasped as grasped values of the thicknesses T2 and T3. In the grasping step of the thicknesses T2 and T3, the thicknesses T2 and T3 may be actually measured, and the measurement values obtained by the measurement may be grasped as grasped values of the thicknesses T2 and T3. The total thickness Tt is obtained by adding the grasped value of the thickness T2 and the grasped value of the thickness T3.

In the determining step of the thickness T1 of the stitch connection portion 10, the thickness T1 is determined such that the thickness T1 is equal to or less than the total thickness Tt. As described above, the thickness T1 is preferably determined such that the absolute value of the difference ΔT is 0.02 mm or less or the thickness T2 of the cathode foil 6 or less.

In the adjusting step of the stitch connection device 40, the stitch connection device 40 is adjusted such that the stitch connection device 40 crushes the stitch connection portion 10 until the determined thickness T1 is reached. The adjustment of the stitch connection device 40 includes adjustment of device setting such as distance setting.

In the connecting step of the lead-out terminal, the lead-out terminal 4 is connected to each of the cathode foil 6 and the anode foil. In the connecting step of the lead-out terminal 4 to the cathode foil 6, the stitch connection device 40 is used. The stitch connection device 40 includes, for example, a first die 42, a second die 44, a stitch needle 46, and a forming die 48.

Figure 6:
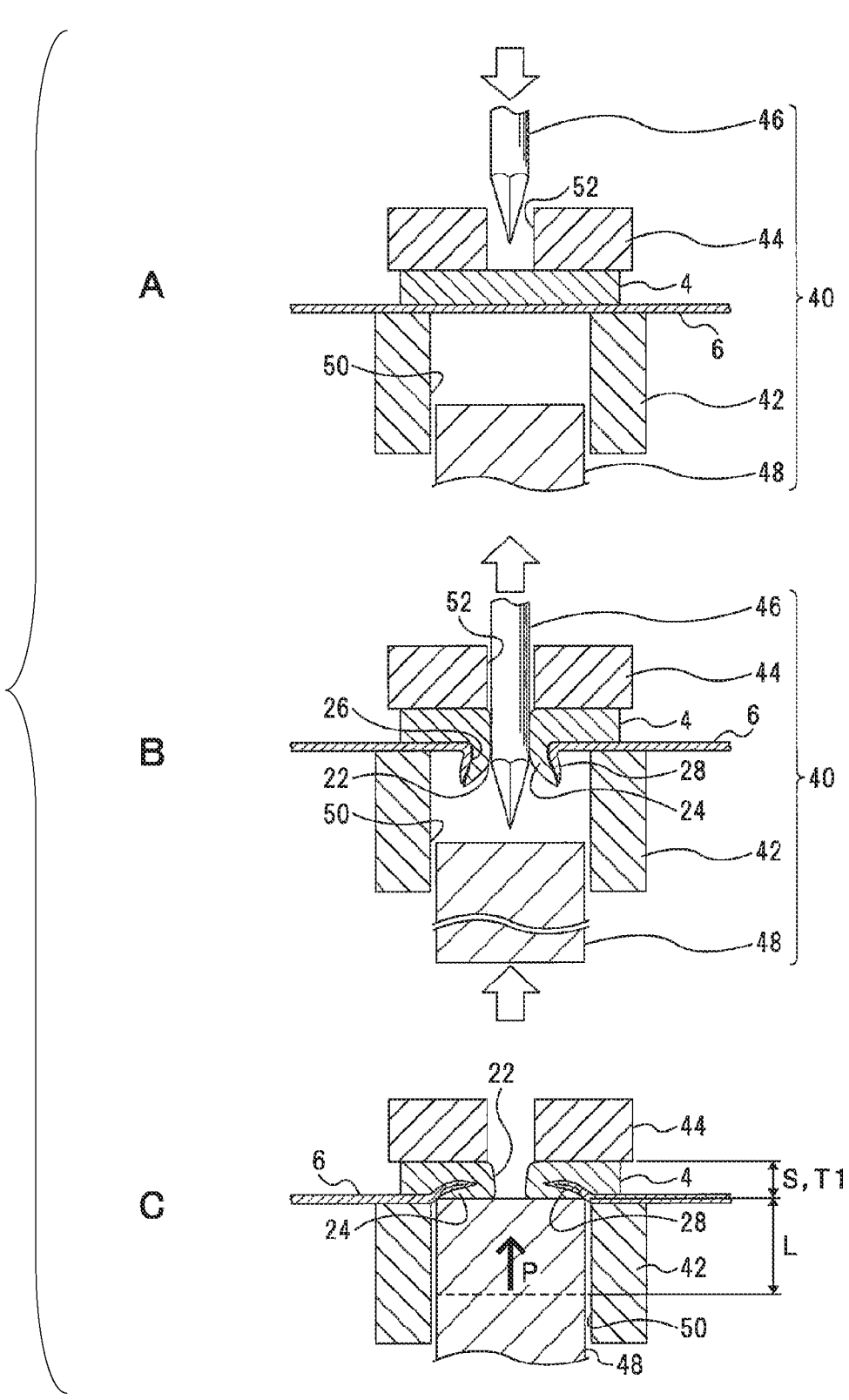
FIG. 6 is a diagram illustrating an example of a connecting step of a lead-out terminal to an electrode foil.

As illustrated in A of FIG. 6, the cathode foil 6 is placed on the first die 42 such as a lower die, and the lead-out terminal 4 is overlapped on an upper surface of the cathode foil 6, that is, the terminal arrangement surface. The second die 44 such as an upper die is placed on an upper surface of the lead-out terminal 4. Therefore, the cathode foil 6 and the lead-out terminal 4 are sandwiched between the first die 42 and the second die 44 and held by the first die 42 and the second die 44. The cathode foil 6 placed on the first die 42 is the cathode foil 6 before the through hole and the foil piece 28 are formed, and the lead-out terminal 4 overlapped on the cathode foil 6 is the lead-out terminal 4 before the terminal hole 22 and the terminal piece 24 are formed.

The first die 42 has a through hole 50, and the second die 44 has a through hole 52. The through hole 50 has a hole shape slightly larger than a cross-sectional shape of the forming die 48. The through hole 52 has a hole shape slightly larger than a cross-sectional shape of the stitch needle 46. The through hole 52 is smaller than the through hole 50 and is disposed directly above the through hole 50. The stitch needle 46 has, for example, an acute and pyramidal tip end portion in a columnar shaft portion, and is disposed above the through hole 52.

The stitch needle 46 is lowered in a direction of an arrow illustrated in A of FIG. 6, and as illustrated in B of FIG. 6, the stitch needle 46 is inserted into the lead-out terminal 4 and the cathode foil 6 from the lead-out terminal 4 side. By inserting the stitch needle 46, the through hole and the foil piece 28 are formed in the cathode foil 6, and the terminal hole 22 and the terminal piece 24 are formed in the lead-out terminal 4. The lowered stitch needle 46 is raised, and the stitch needle 46 is pulled out from the lead-out terminal 4 and the cathode foil 6.

The forming die 48 has, for example, a flat pressing surface on an upper side thereof and is disposed below the through hole 50. The forming die 48 is raised in a direction of an arrow illustrated in B of FIG. 6, and the pressing surface presses the lead-out terminal 4 and the cathode foil 6, particularly the terminal piece 24 and the foil piece 28 from the cathode foil 6 side. As illustrated in C of FIG. 6, the terminal piece 24 and the foil piece 28 are sandwiched between the second die 44 and the forming die 48. The terminal piece 24 and the foil piece 28 are folded back by pressing, and the lead-out terminal 4 is connected to the cathode foil 6.

The adjusted stitch connection device 40 adjusts the thickness T1 of the stitch connection portion 10 to the total thickness Tt or less. In C of FIG. 6, the pressing surface of the forming die 48 before being raised is indicated by a broken line. The stitch connection device 40 raises the forming die 48 by a movement distance L and crushes the stitch connection portion 10 by the second die 44 and the forming die 48. The thickness T1 of the crushed stitch connection portion 10 coincides with a distance S between the second die 44 and the forming die 48. The movement distance L or the distance S is an example of device setting such as distance setting of the stitch connection device 40. In the adjusting step of the stitch connection device 40, for example, the movement distance L or the distance S is set in the stitch connection device 40, and the thickness T1 of the stitch connection portion 10 is adjusted. The distance setting of the stitch connection device 40 may be, for example, a crushing distance of the stitch connection portion 10. The crushing distance is defined as a distance from a reference surface, in which a contact surface formed by contact between the first die 42 and the cathode foil 6 is defined as the reference surface. When the crushing distance is set to 0.00 mm, the stitch connection device 40 raises the pressing surface of the forming die 48 to the reference surface, and the thickness T1 is adjusted to the total thickness Tt. When the crushing distance is set to 0.02 mm, the stitch connection device 40 raises the pressing surface of the forming die 48 to a position 0.02 mm above the contact surface, and adjusts the thickness T1 to a thickness 0.02 mm thinner than the total thickness Tt.

The adjustment of the stitch connection device 40 may be any of position adjustment of an upper limit switch of a cylinder for raising the forming die 48, adjustment of a rotation amount of a screw of a screw type elevator, position adjustment of a stopper for stopping the raising of the forming die 48 by contact, and adjustment by computer control using set value data, or may be other adjustment.

The connecting step of the lead-out terminal 4 to the anode foil may be the same as or different from the connecting step of the lead-out terminal 4 to the cathode foil 6. In particular, the setting of the crushing distance may be different. In the anode foil, since the carbon layer is not formed at the surface, there is little possibility that the anode foil is easily stretched by a stress toward the outside around pressing portions of the terminal piece 24 and the foil piece 28, unlike the cathode foil 6 which is the carbon layer-containing foil. Rather, in the anode foil, unevenness is formed at the surface of the valve metal foil as described above, and a dielectric oxide film is formed on the unevenness by chemical conversion treatment. The dielectric oxide film is hard, and extensibility and flexibility of the anode foil decrease. In order to increase the capacity of the anode foil, a surface area of the anode foil is increased by surface-increasing processing at a higher magnification, but the area of the dielectric oxide film is also increased as the capacity of the anode foil is increased, and as a result, the anode foil becomes fragile and hardened, and flexibility of the material itself is likely to be extremely reduced. In a stitch connecting process of the anode foil which is cured and has reduced flexibility, in order to reduce a pressure applied to the anode foil, it is preferable to press the anode foil and the lead-out terminal 4 so that the thickness of the stitch connection portion is equal to or larger than the total thickness of the flat portion 18 of the lead-out terminal 4 and the anode foil. Therefore, in the connection between the anode foil and the lead-out terminal 4, it is preferable to make the thickness T1 of the stitch connection portion 10 and the thickness of the flat portion 18 of the lead-out terminal 4 and the thickness of foil different in magnitude.

In the producing step of the capacitor element, a first separator is disposed between the anode foil and the cathode foil 6, and a second separator is disposed outside the anode foil or the cathode foil 6. The anode foil, the cathode foil 6, and the first and second separators are wound to produce the capacitor element.

In the sealing step of the capacitor element, the capacitor element impregnated with an electrolyte such as an electrolytic solution is inserted into the exterior case, and a sealing member is attached to the opening portion of the exterior case to produce the capacitor 2.

According to the first embodiment, for example, the following effects can be obtained.

(1) The cathode foil 6 including the carbon layer 14 is easily stretched in the stitch connecting process. Therefore, a difficulty level of connection between the cathode foil 6 including the carbon layer 14 and the lead-out terminal 4 is higher than a difficulty level of connection between the basic cathode foil described above and the lead-out terminal 4 in a connection process such as the stitch connecting process. In the capacitor 2 according to the first embodiment, the stitch connection can be stabilized by adjusting and managing a crushing thickness of the stitch connection portion 10 in the stitch connecting process, that is, the thickness T1 of the stitch connection portion 10.

(2) Since the thickness T1 of the stitch connection portion 10 is adjusted such that the thickness T1 of the stitch connection portion 10 is equal to or less than the total thickness Tt, the equivalent series resistance of the capacitor 2 can be reduced and stabilized. When the thickness T1 of the stitch connection portion 10 is adjusted such that the thickness T1 of the stitch connection portion 10 is less than the total thickness Tt, the equivalent series resistance of the capacitor 2 can be further reduced and further stabilized.

(3) When the absolute value of the difference ΔT is 0.02 mm or less or the thickness T2 of the cathode foil 6 or less, the capacitor 2 can obtain relatively high yield strength of the foil.

(4) The stitch connection suitable for a property of the cathode foil 6 including the carbon layer 14 can be realized, and the stability and reliability of the capacitor 2 including the cathode foil 6 including the carbon layer 14 can be improved.

(5) By sandwiching a periphery of the cathode foil 6 pressed by the forming die 48 between the first die 42 and the second die 44 and restraining the cathode foil 6, a stress toward the outside of the carbon layer 14 can be reduced, and the stability and reliability can be improved. Further, as illustrated in FIG. 6, by sandwiching the corner portions of the lead-out terminal 4 between the first die 42 and the second die 44, it is possible to prevent the stress at the time of pressing by the forming die 48 from being propagated to contact portions of the cathode foil 6 with the corner portions of the lead-out terminal 4. Therefore, when a force as in the test of the yield strength of the foil is applied to the cathode foil 6, cracks are less likely to occur at the contact portion of the cathode foil 6 with the corner portion of the lead-out terminal 4.

Second Embodiment

The capacitor 2 according to the second embodiment has the configuration of the capacitor 2 described in the first embodiment, for example. The contents described in the first embodiment are incorporated into the second embodiment by reference, and the description in the second embodiment is omitted.

Figure 7:
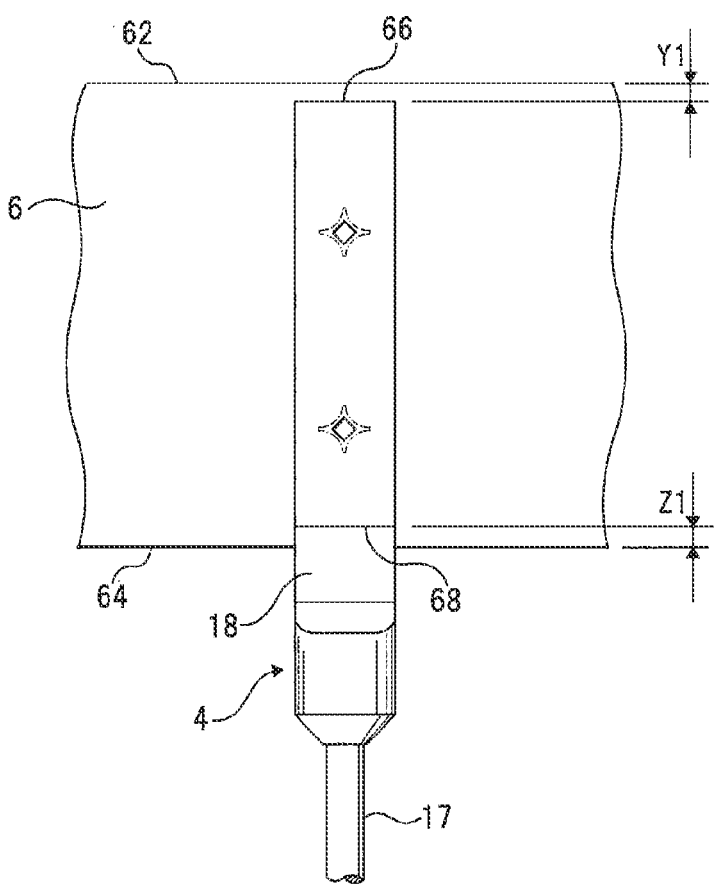
FIG. 7 is a diagram illustrating an example of a lead-out terminal and a cathode foil of a capacitor according to a second embodiment.

FIG. 7 illustrates an example of a lead-out terminal and a cathode foil of a capacitor according to the second embodiment. The configuration illustrated in FIG. 7 is an example, and a technology of the present disclosure is not limited to such a configuration. In the capacitor 2 according to the second embodiment, the positions of a terminal end 66 and a press mark end 68 of the lead-out terminal 4 are adjusted or managed with respect to a foil end 62 and a foil end 64 of the cathode foil 6, respectively, and a foil crack of the cathode foil 6 is prevented. The press mark is a trace formed on the lead-out terminal 4, in particular, the flat portion 18 by pressing of the die such as the second die 44 and the forming die 48 in the connecting step of the lead-out terminal described above, and the press mark end 68 is a trace formed on the flat portion 18 of the lead-out terminal 4 by pressing of a die end portion 70 (FIGS. 12 and 13) of the second die 44. That is, the press mark end 68 represents a boundary of an area to be pressed. The press mark end 68 is formed, for example, on the metal wire 17 side of the flat portion 18.

The terminal end 66 of lead-out terminal 4 is retracted from foil end 62 of cathode foil 6, for example. A distance Y1 (unit: mm) between the terminal end 66 and the foil end 62 is preferably 0.1 or less or 0.5 or more. The distance Y1 may be 0.0, and the terminal end 66 may coincide with the foil end 62. That is, the distance Y1 is adjusted or managed in a range represented by the following formula (3), for example.

$$0.0 \le Y1 \le 0.1, \text{ or } 0.5 \le Y1 \qquad (3)$$

When the distance Y1 is 0.5 or more, it is expected that the foil crack of the cathode foil 6 is prevented as the distance Y1 increases. Accordingly, the maximum value of the distance Y1 may be set from a viewpoint of the structure or performance of the capacitor 2. In addition, the lead-out terminal 4 may protrude from the foil end 62. The protruding lead-out terminal 4 prevents the foil crack of the cathode foil 6.

The press mark end 68 of the lead-out terminal 4 is retracted from the foil end 64 of the cathode foil 6, for example. A distance Z1 (unit: mm) between the press mark end 68 and the foil end 64 is preferably 0.1 or less. The distance Z1 may be 0.0, and the press mark end 68 may coincide with the foil end 64. That is, the distance Z1 is adjusted or managed in a range represented by the following formula (4), for example.

$$0.0 \le Z1 \le 0.1 \qquad (4)$$

The press mark end 68 may protrude from the foil end 64. When the press mark end 68 is adjusted or managed so as to protrude from the foil end 64, the foil crack of the cathode foil 6 is prevented.

FIG. 8 illustrates the result of the first experiment, and illustrates the occurrence of foil cracks at the distance Y1 or Y2 (hereinafter referred to as "distance Y1 or Y2"). The foil crack is defined as a crack extending from the foil end 62 of the cathode foil 6 to the terminal piece 24 of the stitch connection portion 10. The foil crack may be formed in the cathode foil 6 by pressing against the lead-out terminal 4 and the cathode foil 6 in the connecting step of the lead-out terminal described above, for example. In the first experiment, a crack that does not correspond to the definition described above, for example, a crack that does not reach the terminal piece 24, is not treated as a foil crack. A distance Y2 (unit: mm) is defined as a distance between the terminal end 66 of the lead-out terminal 4 protruding from the foil end 62 of the cathode foil 6 and the foil end 62. The first experiment is an experiment for confirming the presence or absence of a foil crack when the distances Y1 and Y2 between the terminal end 66 and the foil end 62 are changed under a condition of the stitch connection of the lead-out terminal 4 to the cathode foil 6 including the carbon layer 14.

When the terminal end 66 protruded from the foil end 62, no foil crack occurred. When the terminal end 66 was aligned with the foil end 62 or retracted from the foil end 62, no foil crack occurred in the range of the distance Y1 represented by the above formula (3). When the distance Y1 was 0.2 mm, 0.3 mm, or 0.4 mm, experimental pieces having a foil crack were confirmed. In the first experiment, it was found that the capacitor 2 satisfying the following conditions (1) and (2) is less likely to cause a foil crack than the capacitor 2 not satisfying the conditions (1) and (2).

Condition (1): The terminal end 66 protrudes from the foil end 62.

Condition (2): The distance Y1 is a value within the range of the above formula (3). That is, the terminal end 66 coincides with the foil end 62, and overlaps the cathode foil 6 at an interval of 0.1 mm or less or 0.5 mm or more from the foil end 62.

Figure 9:
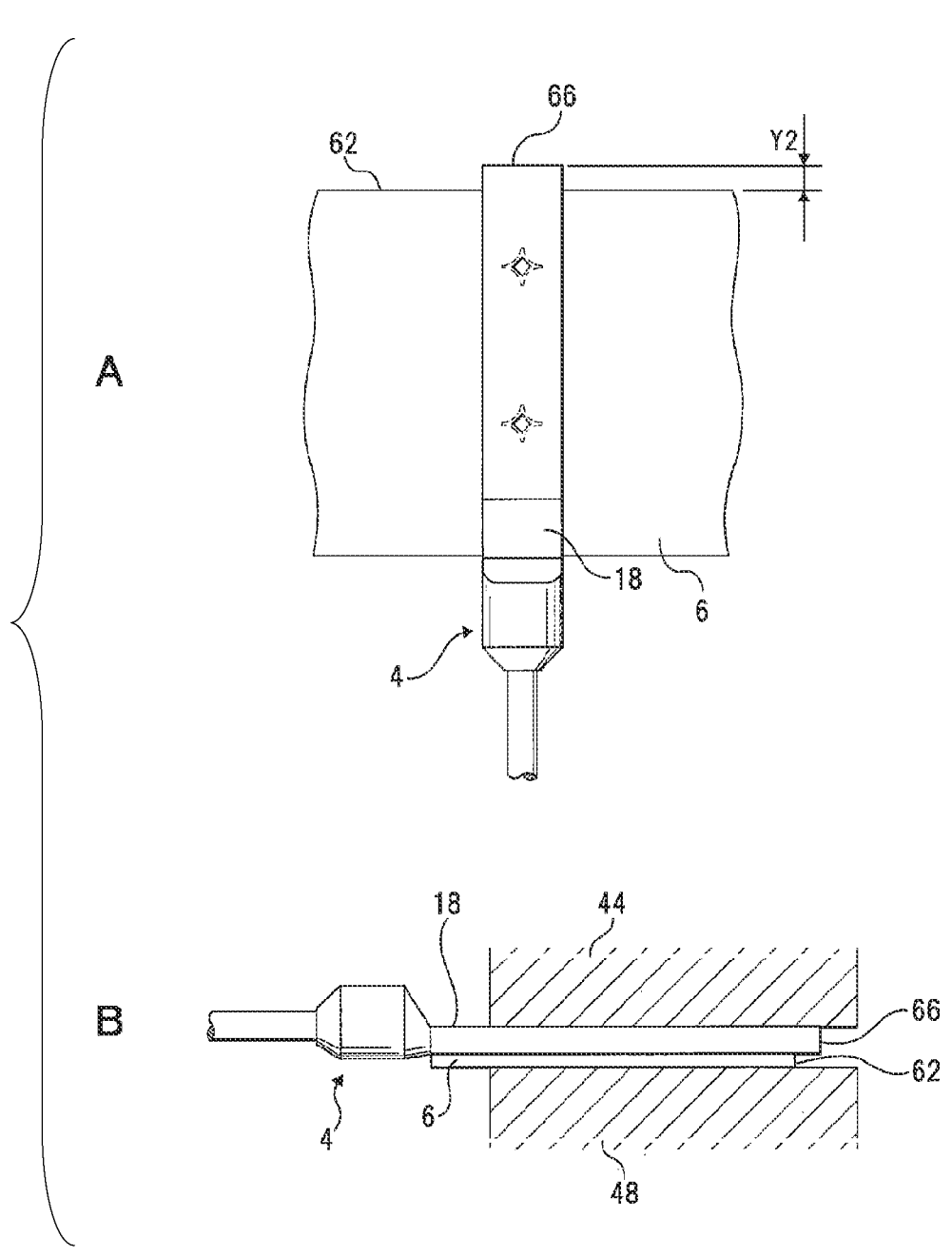
FIG. 9 is a diagram illustrating an estimation mechanism of foil crack prevention.

As illustrated in A of FIG. 9, when the terminal end 66 protrudes from the foil end 62, the lead-out terminal 4 overlaps up to the foil end 62 of the cathode foil 6. Therefore, in the connecting step of the lead-out terminal, as illustrated in B of FIG. 9, the foil end 62 of the cathode foil 6 is sandwiched and fixed between the second die 44 and the forming die 48 via the lead-out terminal 4. As described above, the cathode foil 6 including the carbon layer 14 is easier to stretch than the basic cathode foil (that is, the cathode foil not including the carbon layer). However, when the terminal end 66 protrudes from the foil end 62, it is estimated that the elongation of the foil end 62 is prevented by fixing the foil end 62, and it is estimated that the foil crack of the cathode foil 6 is prevented. When the terminal end 66 coincides with the foil end 62, and when the terminal end 66 is slightly (for example, 0.1 mm) retracted from the foil end 62, it is estimated that the elongation of the foil end 62 is prevented by fixing the foil end 62 or the vicinity of the foil end 62, and it is estimated that the foil crack of the cathode foil 6 is prevented.

Figure 10:
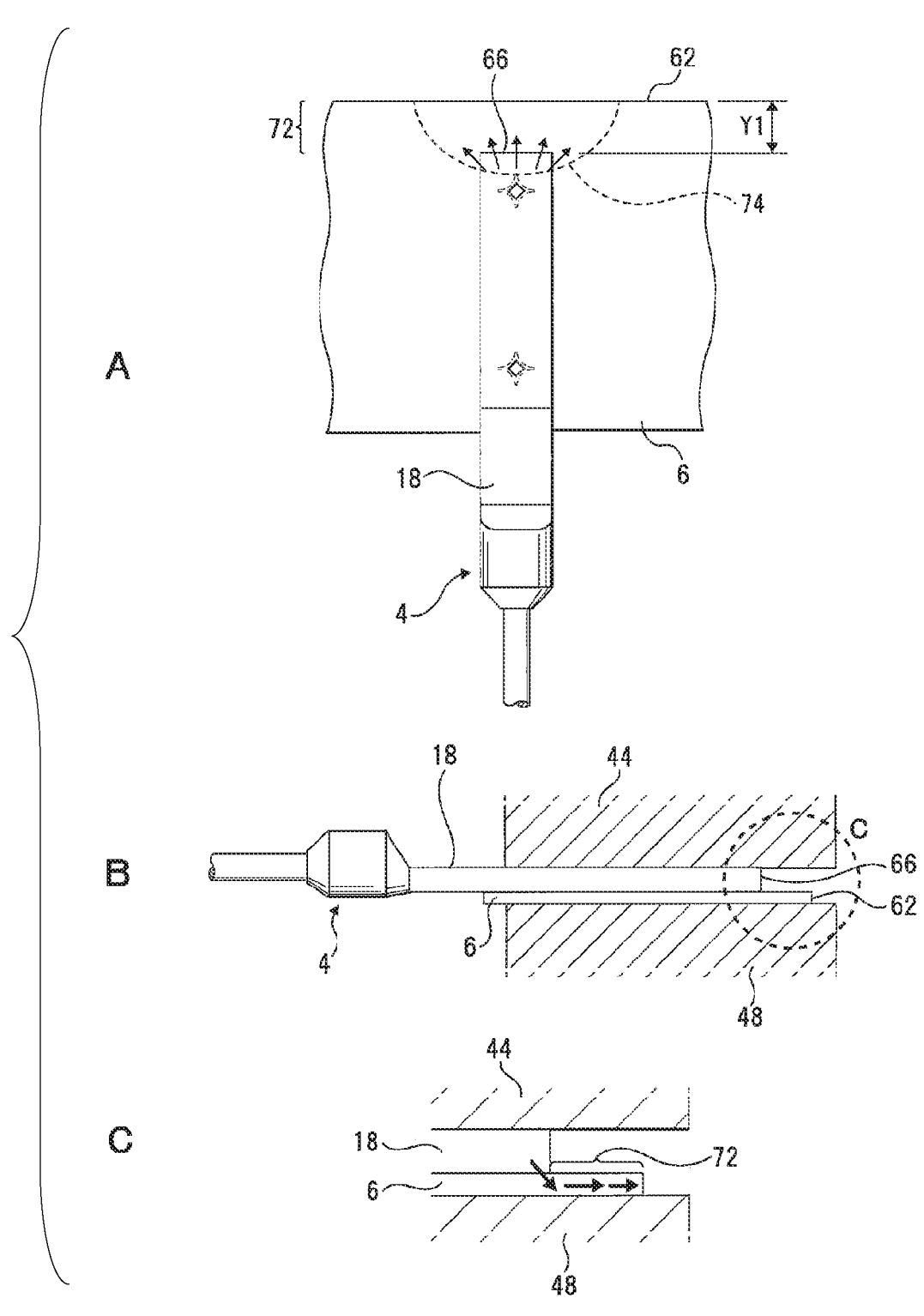
FIG. 10 is a diagram illustrating an estimation mechanism of foil crack prevention or a foil crack.

As illustrated in A of FIG. 10, when the terminal end 66 is retracted from the foil end 62, the cathode foil 6 protrudes from the lead-out terminal 4 to form a protruding foil end portion 72. In the connecting step of the lead-out terminal, as illustrated in B and C of FIG. 10, the protruding foil end portion 72 is in a free state without being sandwiched between the second die 44 and the forming die 48 via the lead-out terminal 4. When the distance of the protruding foil end portion 72, that is, the distance Y1 is, for example, 0.5 mm or more and an area of the protruding foil end portion 72 is wide, it is estimated that the stress propagated from the forming die 48 and the lead-out terminal 4 to the cathode foil 6 is dispersed in a buffer area 74 including the protruding foil end portion 72 and a peripheral area thereof, and it is estimated that the foil crack of the cathode foil 6 is prevented. Arrows in A and C of FIG. 10 indicate the stress propagated to the cathode foil 6.

Even if the terminal end 66 is retracted from the foil end 62, when the distance of the protruding foil end portion 72, that is, the distance Y1 is, for example, 0.2 mm or more and 0.4 mm or less, and the area of the protruding foil end portion 72 is narrow, it is estimated that the stress propagated from the forming die 48 and the lead-out terminal 4 to the cathode foil 6 is propagated to the protruding foil end portion 72, and it is estimated that the elongation of the cathode foil 6 due to the stress increases. Therefore, it is estimated that the cathode foil 6 is cracked.

FIG. 11 illustrates a result of a second experiment, and illustrates the occurrence of foil cracks at the distance Z1 or Z2 (hereinafter referred to as "distance Z1 or Z2"). The definition of the foil crack is the same as the definition of the foil crack in the first experiment except that the foil end 62 is changed to the foil end 64. In the second experiment, a crack that does not correspond to the definition described above, for example, a crack that does not reach the terminal piece 24, is not treated as a foil crack. The distance Z2 (unit: mm) is defined as a distance between the press mark end 68 of the lead-out terminal 4 protruding from the foil end 64 of the cathode foil 6 and the foil end 64. The second experiment is an experiment for confirming the presence or absence of a foil crack when the distances Z1 and Z2 between the press mark end 68 and the foil end 64 are changed under a condition of the stitch connection of the lead-out terminal 4 to the cathode foil 6 including the carbon layer 14.

When the press mark end 68 protruded from the foil end 64, no foil crack occurred. When the press mark end 68 was aligned with the foil end 64 or retracted from the foil end 64, no foil crack occurred in the range of the distance Z1 represented by the above formula (4). When the distance Z1 was 0.2 mm or 0.3 mm, experimental pieces having a foil crack were confirmed. In the second experiment, it was found that the capacitor 2 satisfying the following conditions (3) and (4) is less likely to cause foil crack than the capacitor 2 not satisfying the conditions (3) and (4).

Condition (3): The press mark end 68 protrudes from the foil end 64.

Condition (4): The distance Z1 is a value within the range of the above formula (4). That is, the press mark end 68 coincides with the foil end 64, and overlaps the cathode foil 6 at an interval of 0.1 mm or less from the foil end 64.

Figure 12:
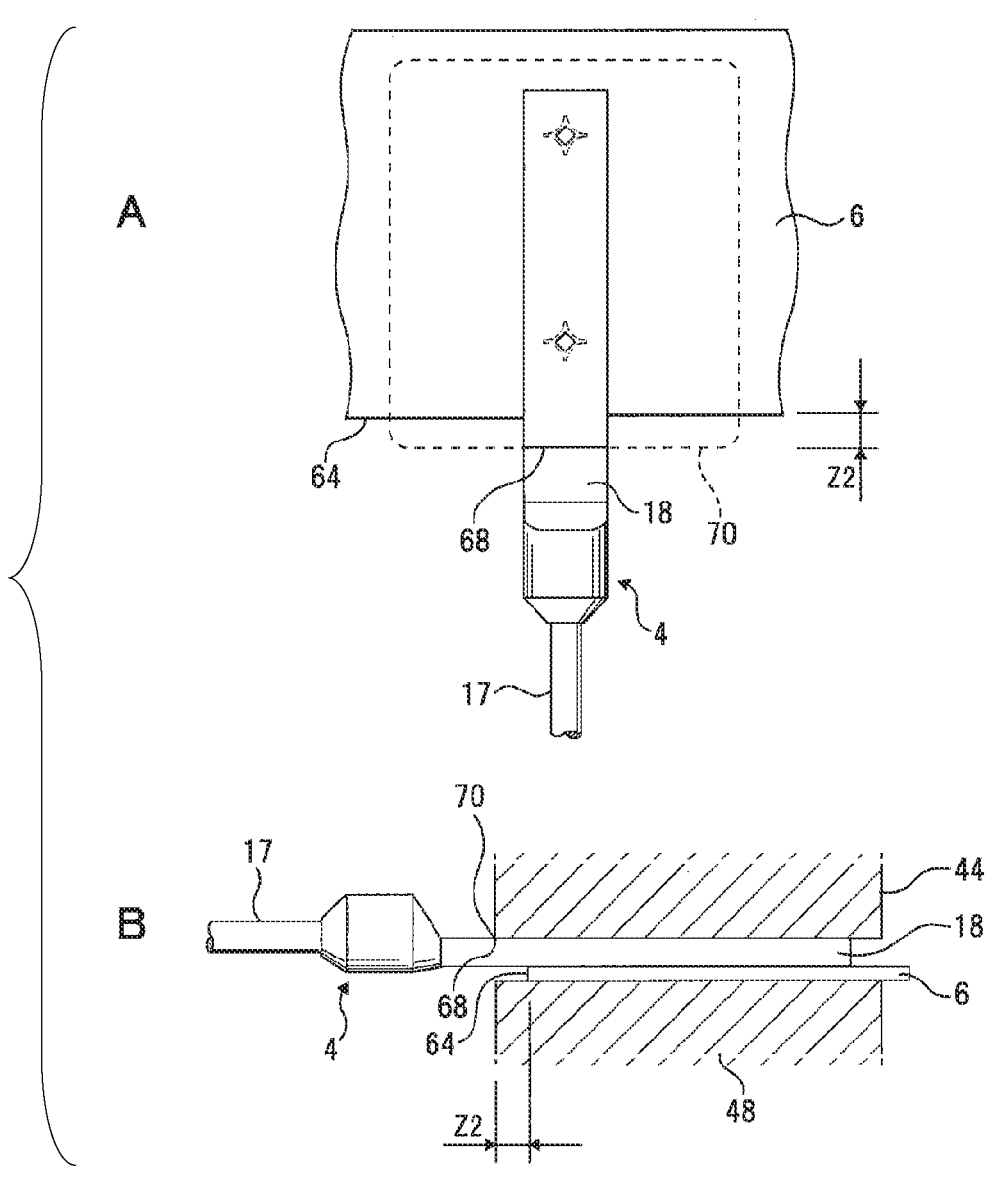
FIG. 12 is a diagram illustrating an estimation mechanism of foil crack prevention.

As illustrated in A of FIG. 12, when the press mark end 68 protrudes from the foil end 64, the pressed area of the lead-out terminal 4 overlaps up to the foil end 64 of the cathode foil 6. In the connecting step of the lead-out terminal, as illustrated in B of FIG. 12, the foil end 64 of the cathode foil 6 is sandwiched and fixed between the second die 44 and the forming die 48 via the lead-out terminal 4. As described above, the cathode foil 6 including the carbon layer 14 is easier to stretch than the basic cathode foil (that is, the cathode foil not including the carbon layer). However, when the cathode foil 6 and the lead-out terminal 4 are sandwiched between the second die 44 and the forming die 48 such that the press mark end 68 is formed outside the foil end 64, it is estimated that the elongation of the foil end 64 is prevented by fixing the foil end 64, and it is estimated that the foil crack of the cathode foil 6 is prevented. When the press mark end 68 coincides with the foil end 64 and when the press mark end 68 is slightly (for example, 0.1 mm) retracted from the foil end 64, it is estimated that the elongation of the foil end 64 is prevented by fixing the foil end 64 or the vicinity of the foil end 64, and it is estimated that the foil crack of the cathode foil 6 is prevented.

Figure 13:
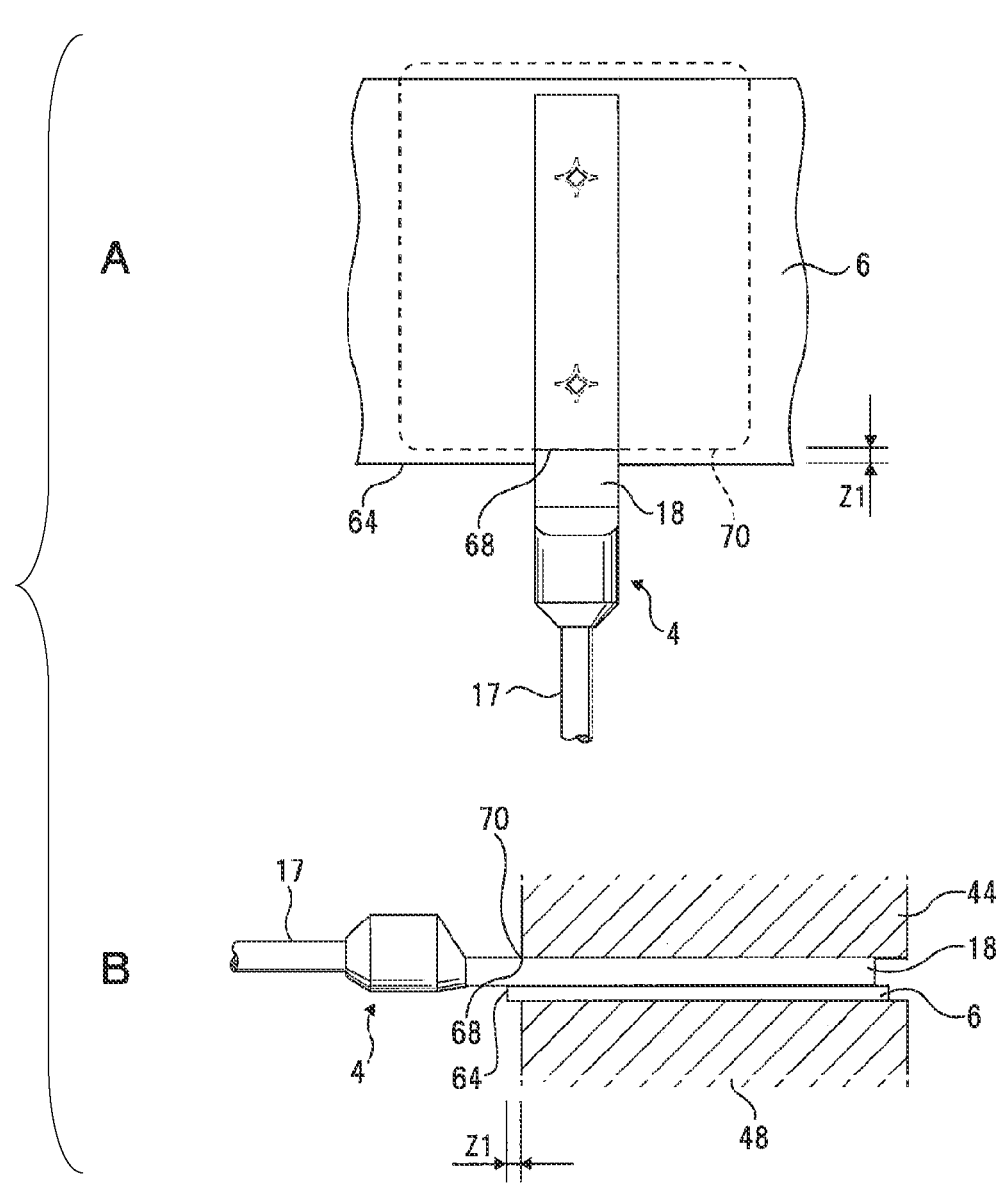
FIG. 13 is a diagram illustrating an estimation mechanism of a foil crack.

As illustrated in A and B of FIG. 13, when the press mark end 68 is retracted from the foil end 64 by 0.2 mm or 0.3 mm, the cathode foil 6 protrudes from the area where the lead-out terminal 4 is pressed, and the foil end 64 and the vicinity thereof are in a free state. The stress from the forming die 48 and the lead-out terminal 4 propagates to the foil end 64 of the cathode foil 6 and the vicinity thereof. Therefore, it is estimated that the foil end 64 of the cathode foil 6 including the carbon layer 14 and the vicinity thereof are deformed, and it is estimated that the foil crack of the cathode foil 6 occurs.

At the distance Z1 of 0.4 mm or more, there is a possibility that there is a condition for preventing the foil crack of the cathode foil 6. When the distance Y1 is, for example, 0.5 mm or more, the foil crack may be prevented, and when the distance Z1 is, for example, 0.5 mm or more, the foil crack may be prevented. The result of the second experiment does not suggest that the same results as 0.2 mm and 0.3 mm are obtained at the distance Z1 of 0.4 mm or more.

The foil crack of the cathode foil 6 does not affect the performance and vibration resistance of the capacitor 2. However, when vibration equal to or larger than an expected vibration is applied to the metal wire 17 of the capacitor 2, and the vibration propagates to the connection portion between the lead-out terminal 4 and the cathode foil 6, the vibration resistance of the capacitor 2 is affected, for example. Therefore, the vibration resistance of the capacitor 2 can be improved by adjusting or managing the distances Y1 and Y2 between the terminal end 66 and the foil end 62 so as to satisfy the condition (1) or the condition (2), and the vibration resistance of the capacitor 2 can be improved by adjusting or managing the distances Z1 and Z2 between the press mark end 68 and the foil end 64 so as to satisfy the condition (3) or the condition (4). Even in use in an environment where vibration is applied, for example, the equivalent series resistance of the capacitor 2 can be maintained for a long period.

[Manufacturing Steps of Capacitor]

Manufacturing steps of the capacitor 2 are an example of a method for manufacturing the capacitor according to the present disclosure, and includes, for example, the producing step of the anode foil, the producing step of the cathode foil 6, the producing step of the separator, the grasping step of the thickness T2 of the cathode foil 6 and the thickness T3 of the flat portion 18 of the lead-out terminal 4, the determining step of the thickness T1 of the stitch connection portion 10, the adjusting step of the stitch connection device 40, the connecting step of the lead-out terminal, the producing step of the capacitor element, and the sealing step of the capacitor element. The producing step of the anode foil, the producing step of the cathode foil 6, the producing step of the separator, the grasping step of the thickness T2 of the cathode foil 6 and the thickness T3 of the flat portion 18 of the lead-out terminal 4, the determining step of the thickness T1 of the stitch connection portion 10, the producing step of the capacitor element, and the sealing step of the capacitor element are the same as those described in the first embodiment. Description of these steps described in the first embodiment will be omitted.

In the adjusting step of the stitch connection device 40, a process similar to the adjusting step of the stitch connection device 40 in the first embodiment is performed, and an adjustment process of the distances Y1 and Y2 and the distances Z1 and Z2 is performed. In the adjustment process of the distances Y1 and Y2, an arrangement position of the lead-out terminal 4 with respect to the cathode foil 6 is adjusted so as to satisfy the condition (1) or the condition (2), for example, and in the adjustment process of the distances Z1 and Z2, the arrangement position of the second die 44 with respect to the cathode foil 6, in particular, the arrangement position of the die end portion 70 is adjusted so that the press mark end 68 to be formed on the lead-out terminal 4 by the pressing of the die satisfies the condition (3) or the condition (4) after the connecting step of the lead-out terminal, for example. The distances Y1 and Y2 and the distances Z1 and Z2 are adjusted by, for example, adjusting the position of an alignment device of the lead-out terminal 4 or the cathode foil 6, adjusting the position of the second die 44 or the forming die 48, or adjusting the positions of a plurality of these. For example, when the cathode foil 6 is fixed at a reference position, the distances Y1 and Y2 are adjusted by adjusting the position of the lead-out terminal 4. When the positions of the cathode foil 6 and the lead-out terminal 4 are fixed, the distances Z1 and Z2 are adjusted by adjusting the position of the second die 44, particularly the position of the die end portion 70. The distances Y1 and Y2 and the distances Z1 and Z2 are basically the same before and after the connecting step of the lead-out terminal. Therefore, in the adjusting step of the stitch connection device 40, the conditions (1) to (4) in the capacitor 2 can be used.

The connecting step of the lead-out terminal is the same as the connecting step of the lead-out terminal in the first embodiment, except that the lead-out terminal 4 is connected to the cathode foil 6 in a state where the distances Y1 and Y2 and the distances Z1 and Z2 are adjusted. Although not described in the connecting step of the lead-out terminal in the first embodiment, when the forming die 48 is raised in the direction of the arrow illustrated in B of FIG. 6 and the pressing surface presses the lead-out terminal 4 and the cathode foil 6 from the cathode foil 6 side, a press mark is formed on the lead-out terminal 4 by the pressing of the second die 44, and the press mark end 68 is formed at a position where the die end portion 70 abuts.

According to the second embodiment, for example, the following effects can be obtained.

(1) The foil crack is prevented, and for example, the connection between the lead-out terminal 4 and the cathode foil 6 can be stabilized.

(2) For the stitch connection of the cathode foil 6 including the carbon layer 14, the thickness T1 of the stitch connection portion 10 is adjusted to be equal to or less than the total thickness Tt described above. That is, in the connecting step of the lead-out terminal, the cathode foil 6 is pressed until the thickness T1 becomes equal to or less than the total thickness Tt, and the stress applied to the cathode foil 6 becomes larger than the pressure applied to the basic cathode foil described above. Therefore, the cathode foil 6 is easily stretched in the width direction of the foil (a longitudinal direction of the lead-out terminal 4). In this case, the foil ends 62 and 64 are fixed at the time of stress generation or the generated stress is widely dispersed by the position adjustment based on the protrusion, coincidence, or retraction of the terminal end 66 or the press mark end 68 or the distance adjustment of the distances Y1 and Y2 or the distances Z1 and Z2. Even if the stress applied to the cathode foil 6 is large, by fixing the foil ends 62 and 64 or dispersing stress, the foil crack can be prevented, and for example, the connection between the lead-out terminal 4 and the cathode foil 6 can be stabilized.

(3) By preventing the foil crack, it is possible to prevent the risk of expansion of the crack due to the vibration and to improve the vibration resistance of the capacitor 2.

(4) By preventing the foil crack, the reliability of the capacitor 2 can be improved.

Features and modifications of the embodiments described above will be listed below.

(1) In the above embodiments, the capacitor element is a winding element. However, the capacitor element may be, for example, a multilayer element in which a plurality of flat anode foils, cathode foils 6, and separators are stacked.

(2) Materials of the anode foil, the cathode foil 6, the separator, the exterior case, the sealing member, and the electrolyte are not limited to those described in the above embodiments. These materials may be aluminum electrolytic capacitors or other materials adopted for similar capacitors. For example, a phenol laminated plate to which an external terminal is attached may be used as the sealing member, a lead-out terminal led out from the capacitor element may be connected to the external terminal of the sealing member after the capacitor element is impregnated with the electrolytic solution, or the capacitor element and the sealing member may be inserted into an exterior case and sealed with the sealing member.

(3) The material of the carbon layer 14 is not limited to that described in the above embodiments. The material forming the carbon layer 14 may be any conductive member containing carbon. The close adhesion or engagement state of the carbon layer 14 with respect to the base material foil 12 is not limited to that described in the above embodiments.

(4) In the above embodiments, at least the thickness T1 of the stitch connection portion 10 may be adjusted to be equal to or less than the total thickness Tt. A pressure receiving portion that receives the pressure from the forming die 48 may have a thickness equal to or less than the total thickness Tt as a whole.

(5) In the above embodiments, the lead-out terminal 4 is disposed on the cathode foil 6, the stitch needle 46 penetrates the lead-out terminal 4 and the cathode foil 6 from above, and the forming die 48 presses the lead-out terminal 4 and the cathode foil 6 from below. However, relative arrangement of the lead-out terminal 4, the cathode foil 6, the stitch needle 46, and the forming die 48 may be the same or similar. The lead-out terminal 4, the cathode foil 6, the stitch needle 46, and the forming die 48 may be arranged so as to be upside down or rotated by any angle with respect to the arrangement thereof in the embodiments, for example.

(6) In the above embodiments, the thickness T1 of the stitch connection portion 10 is adjusted by the device setting of the stitch connection device 40, for example, the adjustment of the distance setting. However, a method for adjusting the thickness T1 is not limited to the adjustment of the distance setting. For example, the thickness T1 may be adjusted by adjusting the magnitude of a pressing pressure P (C of FIG. 6) applied to the lead-out terminal 4 and the cathode foil 6 by the forming die 48, and utilizing the relationship that the thickness T1 becomes thinner as the applied pressure increases. The adjustment of the stitch connection device 40 may be, for example, adjustment of device setting such as pressure setting when the forming die 48 applies the pressure to the lead-out terminal 4 and the cathode foil 6.

(7) In the above embodiments, the step of forming the foil piece 28 and the terminal piece 24 by inserting the stitch needle 46 through the lead-out terminal 4 and the cathode foil 6 and the step of forming the stitch connection portion 10 by pressing the foil piece 28 and the terminal piece 24 with the forming die 48 are performed in a state where both the cathode foil 6 and the lead-out terminal 4 are sandwiched and held by the first die 42 and the second die 44, but the present disclosure is not limited thereto. For example, in a state where both the cathode foil 6 and the lead-out terminal 4 are sandwiched and held by the first die 42 and the second die 44, the stitch needle 46 may be inserted into the lead-out terminal 4 and the cathode foil 6 to form the foil piece 28 and the terminal piece 24, and then in a state where the holding by the first die 42 and the second die 44 is released and the foil piece 28 and the terminal piece 24 are formed, the cathode foil 6 and the lead-out terminal 4 may be fed to the next step. The stitch connection portion 10 may be formed by pressing a surface side of the cathode foil 6 on which the foil piece 28 and the terminal piece 24 are formed and a forming die having a flat pressing surface so as to sandwich the cathode foil 6 from the lead-out terminal 4 side.

(8) In the second embodiment, the distances Y1 and Y2 and the distances Z1 and Z2 are adjusted. However, any one of the distances Y1 and Y2 and the distances Z1 and Z2 may be adjusted, and the distances Y1 and Y2 and the distances Z1 and Z2 may not be adjusted. Even if the distances Y1 and Y2 and the distances Z1 and Z2 are not adjusted, the effect of the first embodiment can be obtained.

Figure 14:
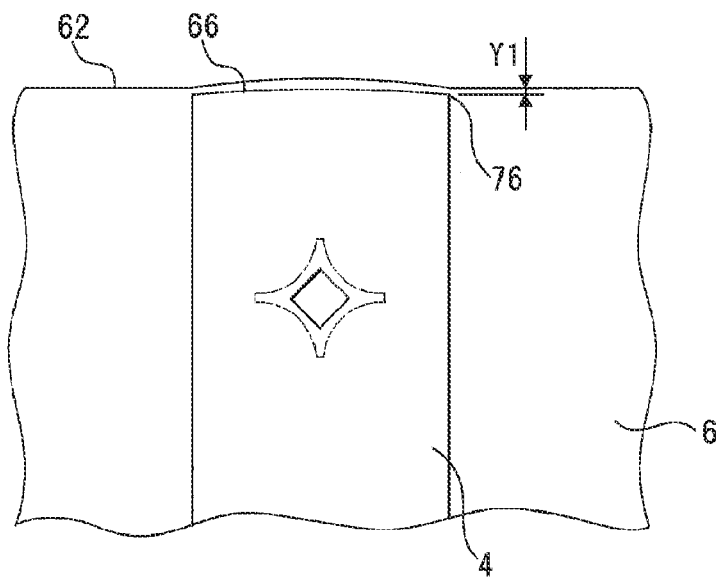
FIG. 14 is a diagram illustrating a modification.

(9) In the second embodiment, shapes of the foil ends 62 and 64 and the terminal end 66 are hardly changed except for a portion where a crack occurs. However, the shapes of the foil ends 62 and 64 and the terminal end 66 may be changed by the pressing in the connecting step of the lead-out terminal. As illustrated in FIG. 14, the foil end 62 and the terminal end 66 may bulge outward, for example, by pressing in the connecting step of the lead-out terminal. Even if the foil end 62 and the terminal end 66 bulge outward, positions of the corner portions 76 of the terminal end 66 and the position of the foil end 62 in the vicinity of the corner portions 76 do not substantially change. That is, when the minimum distance between the corner portion 76 and the foil end 62 is measured as the distances Y1 and Y2, the distances Y1 and Y2 before and after the connecting step of the lead-out terminal can basically be made equal. Further, the foil end 64 and the press mark end 68 may bulge outward, for example, by the pressing in the connecting step of the lead-out terminal. Even if the foil end 64 and the press mark end 68 bulge outward, the position of the corner portion of the press mark end 68 and the position of the foil end 64 in the vicinity of the corner portion do not substantially change. That is, when the minimum distance between the corner portion of the press mark end 68 and the foil end 64 is measured as the distances Z1 and Z2, the distances Z1 and Z2 before and after the connecting step of the lead-out terminal can basically be made equal.

(10) In the second embodiment, the positions of both ends of the second die 44 coincide with the positions of both ends of the forming die 48 in the longitudinal direction of the lead-out terminal 4. However, the positions of both ends or one end of the second die 44 may be different from the positions of both ends or one end of the forming die 48, and it is expected that the same results as the result of the first experiment and the result of the second experiment can be obtained.

(11) In the second embodiment, the distances Y1 and Y2 and the distances Z1 and Z2 are adjusted by the adjustment of the stitch connection device 40. However, in order to adjust the distances Y1 and Y2 or the distances Z1 and Z2, a foil width of the cathode foil 6 or a length of the flat portion 18 of the lead-out terminal 4 may be further adjusted. The degree of freedom of adjustment can be increased by increasing the number of adjustment items.

(12) In the above embodiments, the step of forming the foil piece 28 and the terminal piece 24 by inserting the stitch needle 46 through the lead-out terminal 4 and the cathode foil 6 is performed in a state where both the cathode foil 6 and the lead-out terminal 4 are sandwiched and held by the first die 42 and the second die 44, but the present disclosure is not limited thereto. For example, a through hole may be formed in advance at a position where the through hole is formed by the stitch needle 46 of the cathode foil 6, the lead-out terminal 4 may be overlapped on the cathode foil 6 so as to cover the through hole, and the stitch needle 46 may be inserted through the lead-out terminal 4 so that the terminal hole 22 is formed at a position corresponding to the through hole formed in the cathode foil 6 in advance in a state where both the cathode foil 6 and the lead-out terminal 4 are sandwiched and held by the first die 42 and the second die 44. In this way, since the through hole is formed at the position where the stitch needle 46 is inserted into the cathode foil 6, the stitch needle 46 does not penetrate the cathode foil 6, and the foil piece 28 is not formed, or the foil piece 28 which is formed to be small is formed. Therefore, when the terminal piece 24 is pressed by the forming die 48, the foil piece 28 is not present between the terminal piece 24 and the cathode foil 6, unlike in the above embodiments. As described above, when the carbon layer is formed at the surface, the cathode foil 6 is easily stretched. Since the easily stretchable foil piece 28 is not present between the terminal piece 24 and the cathode foil 6, the extension due to the pressing of the cathode foil 6 overlapping the foil piece 28 is prevented, and the connection between the lead-out terminal 4 and the cathode foil 6 can be further stabilized. In this case, the stitch connection portion is an area in which the terminal piece 24 is disposed, and indicates an area including a portion in which the lead-out terminal 4, the cathode foil 6, and the terminal piece 24 are stacked from the terminal hole 22.

As described above, the most preferred embodiments and the like of the present disclosure have been described, but the present disclosure is not limited to the above description, it is needless to say that various modifications and changes can be made by those skilled in the art based on the gist of the disclosure described in the claims and disclosed in the specification, and such modifications and changes are included in the scope of the present disclosure.

INDUSTRIAL APPLICABILITY

The technique of the present disclosure can be used for connection between a cathode foil including a carbon layer and a lead-out terminal and for a capacitor including the same, which is useful.

REFERENCE SIGNS LIST 2 capacitor
4 lead-out terminal
6 cathode foil
10 stitch connection portion
12 base material foil
14 carbon layer
16 unevenness
16-1 recess
16-2 protrusion
17 metal wire
18 flat portion
22 terminal hole
24 terminal piece
28 foil piece
32 foil
34 first main surface
36 second main surface
40 stitch connection device
42 first die
44 second die
46 stitch needle
48 forming die
50, 52 through hole
62, 64 foil end
66 terminal end
68 press mark end
70 die end portion
72 protruding foil end portion
74 buffer area
76 corner portion

The invention claimed is:

1. A capacitor comprising:
a cathode foil including a carbon layer disposed at a surface of a base material foil; and
a lead-out terminal including a flat portion connected to the cathode foil by stitch connection at a stitch connection portion, wherein
a thickness of the stitch connection portion is equal to or less than a total thickness of a thickness of the cathode foil and a thickness of the flat portion.

2. The capacitor according to claim 1, wherein
a terminal end of the lead-out terminal protrudes from a foil end of the cathode foil, coincides with the foil end, or overlaps the cathode foil at an interval of 0.1 millimeter or less or 0.5 millimeter or more from the foil end.

3. The capacitor according to claim 2, wherein
the thickness of the stitch connection portion is less than the total thickness.

4. The capacitor according to claim 3, wherein
an absolute value of a difference between the thickness of the stitch connection portion and the total thickness is 0.02 millimeter or less.

5. The capacitor according to claim 4, wherein
the thickness of the flat portion is 0.18 millimeter or more and 0.35 millimeter or less, and the thickness of the cathode foil is 0.01 millimeter or more and 0.06 millimeter or less.

6. The capacitor according to claim 3, wherein
the thickness of the flat portion is 0.18 millimeter or more and 0.35 millimeter or less, and the thickness of the cathode foil is 0.01 millimeter or more and 0.06 millimeter or less.

7. The capacitor according to claim 2, wherein
an absolute value of a difference between the thickness of the stitch connection portion and the total thickness is 0.02 millimeter or less.

8. The capacitor according to claim 7, wherein
the thickness of the flat portion is 0.18 millimeter or more and 0.35 millimeter or less, and the thickness of the cathode foil is 0.01 millimeter or more and 0.06 millimeter or less.

9. The capacitor according to claim 2, wherein
the thickness of the flat portion is 0.18 millimeter or more and 0.35 millimeter or less, and the thickness of the cathode foil is 0.01 millimeter or more and 0.06 millimeter or less.

10. The capacitor according to claim 1, wherein
the thickness of the stitch connection portion is less than the total thickness.

11. The capacitor according to claim 10, wherein
an absolute value of a difference between the thickness of the stitch connection portion and the total thickness is 0.02 millimeter or less.

12. The capacitor according to claim 11, wherein
the thickness of the flat portion is 0.18 millimeter or more and 0.35 millimeter or less, and the thickness of the cathode foil is 0.01 millimeter or more and 0.06 millimeter or less.

13. The capacitor according to claim 10, wherein
the thickness of the flat portion is 0.18 millimeter or more and 0.35 millimeter or less, and the thickness of the cathode foil is 0.01 millimeter or more and 0.06 millimeter or less.

14. The capacitor according to claim 1, wherein
an absolute value of a difference between the thickness of the stitch connection portion and the total thickness is 0.02 millimeter or less.

15. The capacitor according to claim 14, wherein
the thickness of the flat portion is 0.18 millimeter or more and 0.35 millimeter or less, and the thickness of the cathode foil is 0.01 millimeter or more and 0.06 millimeter or less.

16. The capacitor according to claim 1, wherein
the thickness of the flat portion is 0.18 millimeter or more and 0.35 millimeter or less, and the thickness of the cathode foil is 0.01 millimeter or more and 0.06 millimeter or less.

17. A method for manufacturing a capacitor, the method comprising:
a step of producing a cathode foil including a carbon layer disposed at a surface of a base material foil; and
a step of disposing a flat portion of a lead-out terminal on a terminal arrangement surface of the cathode foil, and connecting the flat portion to the cathode foil at a stitch connection portion by a stitch connecting process so that a thickness of the stitch connection portion is equal to or less than a total thickness of a thickness of the cathode foil and a thickness of the flat portion.

18. The method for manufacturing a capacitor according to claim 17, wherein in the step of connecting the flat portion to the cathode foil, the flat portion is connected to the cathode foil so that a terminal end of the lead-out terminal protrudes from a foil end of the cathode foil, or in the step of connecting the flat portion to the cathode foil, the flat portion is connected to the cathode foil so that the terminal end coincides with the foil end or overlaps the cathode foil at an interval of 0.1 millimeter or less or 0.5 millimeter or more from the foil end.

19. A method for manufacturing a capacitor, the method comprising:

a step of grasping a thickness of a cathode foil including a carbon layer disposed at a surface of a base material foil and a thickness of a flat portion of a lead-out terminal;

a step of determining a thickness of a stitch connection portion so that the thickness of the stitch connection portion is equal to or less than a total thickness of the thickness of the cathode foil and the thickness of the flat portion;

a step of adjusting a stitch connection device so that the stitch connection device crushes the stitch connection portion until the thickness of the stitch connection portion becomes the determined thickness; and a step of connecting the flat portion to the cathode foil by the adjusted stitch connection device.

20. The method for manufacturing a capacitor according to claim 19, wherein in the step of adjusting the stitch connection device, the stitch connection device is adjusted so that a terminal end of the lead-out terminal protrudes from a foil end of the cathode foil, or in the step of adjusting the stitch connection device, the stitch connection device is adjusted so that the terminal end coincides with the foil end or overlaps the cathode foil at an interval of 0.1 millimeter or less or 0.5 millimeter or more from the foil end.

\* \* \* \* \*